United States Patent
Sakai et al.

(10) Patent No.: US 8,428,804 B2
(45) Date of Patent: Apr. 23, 2013

(54) IN-VEHICLE CHARGE AND DISCHARGE CONTROL APPARATUS AND PARTIAL CONTROL APPARATUS

(75) Inventors: Tadashi Sakai, Obu (JP); Kazunao Yamada, Toyota (JP); Yusuke Mizuno, Anjo (JP)

(73) Assignee: DENSO CORPORATION, Kariya (JP)

( * ) Notice: Subject to any disclaimer, the term of this patent is extended or adjusted under 35 U.S.C. 154(b) by 427 days.

(21) Appl. No.: 12/923,046

(22) Filed: Aug. 31, 2010

(65) Prior Publication Data

US 2011/0066310 A1 Mar. 17, 2011

(30) Foreign Application Priority Data

Sep. 11, 2009 (JP) .................... 2009-210566

(51) Int. Cl.
*B60L 9/00* (2006.01)
(52) U.S. Cl.
USPC .................. 701/22; 180/65.28; 180/65.29
(58) Field of Classification Search .............. 180/65.1, 180/68.4, 65.28, 65.29; 701/22; 320/134, 320/118, 116, 127; 702/63; 307/10.1
See application file for complete search history.

(56) References Cited

U.S. PATENT DOCUMENTS

| | | | |
|---|---|---|---|
| 6,314,347 | B1 | 11/2001 | Kuroda et al. |
| 2008/0183348 | A1* | 7/2008 | Arita et al. .................. 701/22 |
| 2010/0305799 | A1 | 12/2010 | Yamada et al. |

FOREIGN PATENT DOCUMENTS

| | | |
|---|---|---|
| JP | A-11-195437 | 7/1999 |
| JP | A-2001-183150 | 7/2001 |
| JP | A-2003-219510 | 7/2003 |
| JP | A-2004-248455 | 9/2004 |
| JP | A-2004-324613 | 11/2004 |
| JP | A-2006-139963 | 6/2006 |
| JP | A-2006-207539 | 8/2006 |
| JP | A-2006-306231 | 11/2006 |
| JP | A-2007-19687 | 1/2007 |
| JP | A-2007-48485 | 2/2007 |
| JP | A-2007-221885 | 8/2007 |
| JP | A-2008-183937 | 8/2008 |
| JP | A-2008-184077 | 8/2008 |
| JP | A-2010-234972 | 10/2010 |
| JP | A-2011-006047 | 1/2011 |

* cited by examiner

*Primary Examiner* — Behrang Badii
(74) *Attorney, Agent, or Firm* — Posz Law Group, PLC

(57) ABSTRACT

A temperature increase of a battery of a vehicle in a schedule effect road range is estimated based on an estimate of energy acquirable by regeneration in the schedule effect road range of the vehicle. A special value of the battery upper limit temperature is designated which is obtained by subtracting the temperature increase from a default value of the battery upper limit temperature. A battery upper limit temperature reduction road range is designated which is located just prior to the schedule effect road range. While the vehicle runs the battery upper limit temperature reduction road range, the battery upper limit temperature is set at the special value by being switched from the default value. When the vehicle completes running the battery upper limit temperature reduction road range and starts running the schedule effect road range, the battery upper limit temperature is returned to the default value from the special value.

10 Claims, 12 Drawing Sheets

FIG. 5

| CLOCK T [sec] | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| ROAD ID | 00 | 01 | 03 | 01 | 01 | 01 | 02 | 02 | 02 | 02 | 03 | 03 | 03 | 03 | 03 | 04 |
| DISTANCE [m] | 00 | 01 | 03 | 06 | 10 | 15 | 20 | 30 | 35 | 39 | 42 | 47 | 51 | 54 | 57 | 62 |
| VELOCITY [km/h] | 00 | 04 | 08 | 12 | 16 | 20 | 20 | 40 | 20 | 16 | 12 | 20 | 16 | 12 | 12 | 20 |
| GRADIENT [%] | 01 | 01 | 01 | 02 | 02 | 00 | 00 | 00 | 02 | 03 | 02 | 00 | 00 | 00 | 00 | 00 |
| BATTERY TEMP [°C] | 34 | 35 | 36 | 36 | 37 | 38 | 38 | 39 | 40 | 40 | 40 | 40 | 40 | 40 | 40 | 40 |
| DRIVING POWER [kW] | 00 | 00 | 05 | 10 | 20 | -5 | 10 | 20 | -5 | -5 | 10 | 10 | 10 | 10 | 10 | 10 |

R. RANGE 2

IN-VEHICLE CHARGE AND DISCHARGE CONTROL APPARATUS AND PARTIAL CONTROL APPARATUS

CROSS REFERENCE TO RELATED APPLICATION

The present application is based on and incorporates herein by reference Japanese Patent Application No. 2009-210566 filed on Sep. 11, 2009.

FIELD OF THE INVENTION

The present invention relates to an in-vehicle charge and discharge control apparatus and a partial control apparatus contained in the same.

BACKGROUND OF THE INVENTION

[Patent document 1] JP-2008-183937 A
[Patent document 2] JP-2000-333305 A (U.S. Pat. No. 6,314, 347)
[Patent document 3] JP-2001-183150 A
[Patent document 4] JP-2007-19687 A
[Patent document 5] JP-H11-195437 A
[Patent document 6] JP-2006-207539 A There is conventionally known an in-vehicle battery for supplying an electric power to an electronic apparatus such as a motor in the vehicle while accumulating an electric power which the above motor generates by regeneration at the time of deceleration of the vehicle (for example, refer to Patent documents 1 to 6).

Such a battery deteriorates when a temperature becomes too high; thus, the battery temperature is monitored for preventing the deterioration. When the battery temperature becomes greater than the battery upper limit temperature, the battery restriction strengthening control is considered which reduces, in the battery, a maximum of the input and output power to another electronic apparatus.

There may be arising a situation where the battery restriction strengthening control is not executed in a road range enabling little energy accumulated by regeneration whereas the battery restriction strengthening control is executed in a road range (for example, downward slope) enabling much energy accumulated by regeneration. Such a situation makes it impossible to accumulate energy efficiently. The battery temperature has a general tendency to increase with increasing the regeneration. Thus, the above situation occurs often.

SUMMARY OF THE INVENTION

The present invention takes the above situation into consideration with respect to an in-vehicle charge and discharge control apparatus which accumulates in a battery an electric power which a motor generates by regeneration.

It is an object of the present invention to provide a technology to enable the battery to efficiently accumulate energy in a battery restriction strengthening control which reduces an upper limit of an input and output power from a usual value when the battery, temperature becomes a battery upper limit temperature or greater.

To achieve the above object, according to an example of the present invention, an in-vehicle charge and discharge control apparatus in a vehicle having a battery to supply an electric power to an electronic apparatus is provided as follows. The battery accumulates an electric power which a motor in the vehicle generates by regeneration during deceleration of the vehicle. The in-vehicle charge and discharge control apparatus comprises a battery temperature control section, an estimate section, a temperature designation section, a temperature designation section, a temperature designation section, a road range designation section, and a change section. Here, the battery temperature control section is configured to execute a cooling control when a battery temperature is equal to or greater than a battery upper limit temperature, the cooling control executing a battery restriction strengthening control which reduces in the battery a maximum of an input and output power to the electronic apparatus. The estimate section is configured to estimate a temperature increase of the battery in an estimate road range, which the vehicle is estimated to travel, based on an estimate of energy acquirable by regeneration in the estimate road range. The temperature designation section is configured to designate as a special value of the battery upper limit temperature a temperature obtained by subtracting the temperature increase from a default value of the battery upper limit temperature. The road range designation section is configured to designate a road range just prior to the estimate road range as a battery upper limit temperature reduction road range. The change section is configured to cause the battery temperature control section to execute a battery upper limit temperature changeover control. The battery upper limit temperature changeover control changes a value of the battery upper limit temperature from the default value to the special value in cases that the vehicle is running the battery upper limit temperature reduction road range, and returns the value of the battery upper limit temperature from the special value to the default value in cases that the vehicle completes traveling of the battery upper limit temperature reduction road range and enters the estimate road range.

Under such a configuration of an in-vehicle charge and discharge control apparatus, the following takes place. A temperature increase of the battery in the estimate road range of the vehicle is estimated based on an estimate of energy acquirable by regeneration in the estimate road range the vehicle is estimated to travel. A special value of the battery upper limit temperature is designated which is obtained by subtracting the temperature increase from a default value of the battery upper limit temperature. A battery upper limit temperature reduction road range is designated as a road range just prior to the estimate road range. Then, a battery upper limit temperature changeover control is executed. That is, when the vehicle is running the battery upper limit temperature reduction road range, the value of the battery upper limit temperature is set to the special value by being changed from the default value; when the vehicle completes travel of the battery upper limit temperature reduction road range and enters the estimate road range, the value of the battery upper limit temperature is returned to the default value.

Thus, the battery upper limit temperature in the battery upper limit temperature reduction road range is set at the special value; thereby, the cooling control is executed when the battery temperature is increased to equal to or greater than the special value of the battery upper limit temperature. Therefore, in the battery upper limit temperature reduction road range, the control is made such that the battery temperature is less than the special value of the battery upper limit temperature less than the default value of the battery upper limit temperature.

Then, when the battery upper limit temperature reduction road range is completed and the estimate road range is entered, the battery upper limit temperature returns to the default value greater than the special value of the battery upper limit temperature. Thus, the battery temperature at the start point of the estimate road range (namely, at the end point of the battery upper limit temperature reduction road range) is controlled so as to be less than the special value of the battery upper limit temperature. After entering the estimate road range, even if the battery temperature rises by the estimated temperature increase, it does not reach the default value of the battery upper limit temperature, thereby eliminating the need or occurrence of the cooling control. Therefore, the battery restriction strengthening control is not executed, thereby not restricting an acquirable electric power amount from the regeneration. The battery is thus enabled to accumulate energy efficiently.

As another example of the present invention, a partial control apparatus is provided to comprise, of the above in-vehicle charge and discharge control apparatus, the estimate section; the temperature designation section; the road range designation section; and the change section.

BRIEF DESCRIPTION OF THE DRAWINGS

The above and other objects, features, and advantages of the present invention will become more apparent from the following detailed description made with reference to the accompanying drawings. In the drawings:

FIG. 5 is a diagram illustrating an example of a travel history stored in a storage medium;

DETAILED DESCRIPTION OF THE PREFERRED EMBODIMENTS

Figure 1:
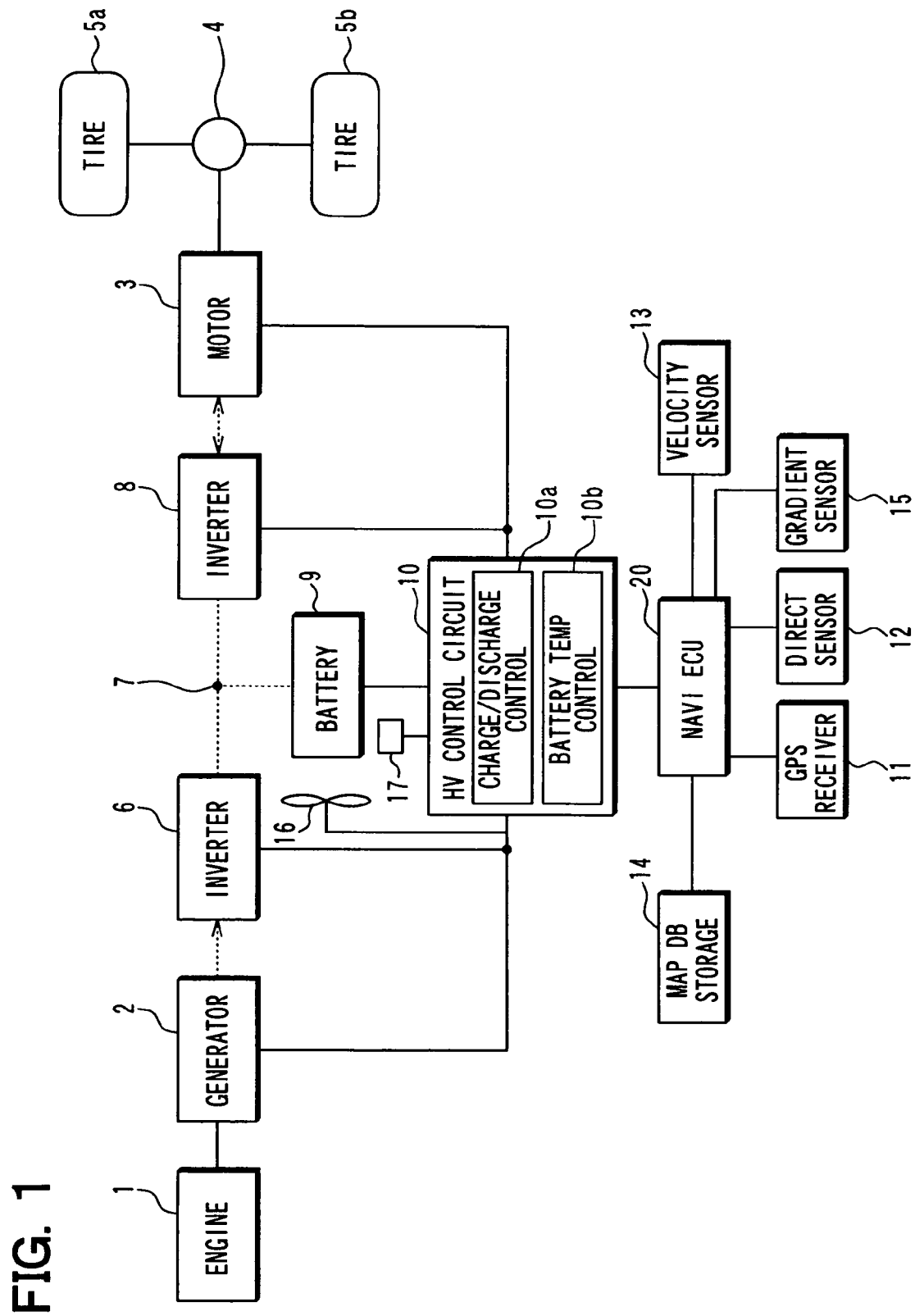
FIG. 1 is a diagram illustrating a schematic configuration of an in-vehicle charge and discharge control apparatus of a hybrid vehicle according to an embodiment of the present invention.

According to an embodiment of the present invention, an in-vehicle charge and discharge control apparatus of a hybrid vehicle is explained with reference to the drawings. The schematic configuration of the charge and discharge control apparatus is illustrated in FIG. 1. The hybrid vehicle includes an engine 1 as an internal-combustion engine, an electric generator 2, a motor 3, a differential gear device 4, tires 5a, 5b, an inverter 6, a DC link 7, an inverter 8, a battery 9, a HV (Hybrid Vehicle) control circuit 10, a battery cooling fan 16, a battery temperature sensor 17, a GPS receiver 11, a direction sensor 12, a vehicle velocity sensor 13, a map DB storage device 14, a gradient sensor 15, and a navigation ECU 20 (also serving as a partial control apparatus). The battery 9 uses a nickel hydoride battery.

The hybrid vehicle runs or travels using the engine 1 and the motor 3 as a power source for running or travel. When the engine 1 is used as the power source, a rotation power (driving power) of the engine 1 is transmitted to the tires 5a and 5b via an unshown clutch mechanism and the differential gear device 4. When the motor 3 is used as the power source, a direct current of the battery 9 is converted into an alternating power via the DC link 7 and the inverter 8. The motor 3 operates on the alternating power. A rotation power (or driving power) of the motor 3 is transmitted to the tires 5a and 5b via the differential gear device 4. The vehicle travel or traveling only using the engine 1 as the power source is referred to as an engine travel (also referred to as an engine travel mode). The vehicle travel or traveling only using the motor 3 as the power source is referred to as a motor travel (also referred to as a motor travel mode). The vehicle travel or traveling using both the engine 1 and the motor 3 as the power source is referred to an assist travel (also referred to as an assist travel mode).

The rotation power of the engine 1 is also transmitted to the electrical generator 2. The rotation power causes the electrical generator 2 to generate an alternating power. The generated alternating power is converted into a direct power via the inverter 6 and the DC link 7. The direct current power can be charged or accumulated in the battery 9. That is, the engine 1 operating by using fuel can charge the battery 9. This type of electric charge is hereafter referred to as an internal combustion charge.

At the time of deceleration of the hybrid vehicle, the resistance of an unshown oil brake and the resistance of the motor 3 are transmitted to the tires 5a, 5b, thereby achieving the deceleration. At this time, a rotation power or torque is added to the motor 3 as a reaction of the resistance of the motor 3. The rotation power of the motor 3 generates an alternating power. The generated alternating power is converted into a direct power via the inverter 8 and the DC link 7. The direct current power can be charged or accumulated in the battery 9. Hereinafter, this type of electric charge is referred to as regeneration or regeneration charge. That is, the battery 9 accumulates an electric power by regeneration at the time of deceleration of the vehicle.

The battery 9 accumulates the electric power generated by the electric generator 2 and the motor 3 as mentioned above. In addition, the battery 9 supplies the accumulated electric power to the motor 3 as a driving power. Further, the battery 9 supplies the electric power to auxiliary apparatuses such as a lighting, an air-conditioning apparatus, an audio apparatus, a power window, the HV control circuit 10, and the navigation ECU 20 in the vehicle.

The battery cooling fan 16 is a cooling device for cooling the battery 9 by sending a wind to the battery 9; it operates according to the control of the HV control circuit 10. The battery temperature sensor 17 is a sensor for detecting a (battery) temperature of the battery 9 to be outputted to the HV control circuit 10.

In accordance with an instruction signal from the navigation ECU 20 or the like, the HV control circuit 10 controls execution or nonexecution of the above mentioned apparatuses, i.e., whether or not to operate the electrical generator 2, the motor 3, the inverters 6 and 8, the battery 9, and the battery cooling fan 16.

For instance, the HV control circuit 10 controls the following: the selection of execution of either an engine travel or an assist travel, the selection of whether to execute an internal combustion charge, the selection of whether to execute a regeneration charge, the selection of the distribution of the output of the engine 1 and the output of the motor 3 in executing an assist travel, and the selection of the distribution of the rotation power of the engine 1 transmitted to the tires (or wheels) 5a, 5b and the electric generator 2 in executing an internal combustion charge. The HV control circuit 10 may use a microcomputer or hardware device having a dedicated circuit configuration for embodying the following functions.

In detail, the HV control circuit 10 executes a charge and discharge control 10a and a battery temperature control 10b, as illustrated in FIG. 1. In other words, the HV control circuit 10 includes a charge and discharge control section 10a and a battery temperature control section 10b.

For the charge and discharge control 10a, the HV control circuit 10 records or stores two values, that is, a present SOC (State Of Charge) and a reference SOC. The HV control circuit 10 performs the following processes (A), (B), and (C).

(A) The HV control circuit 10 periodically reports the present SOC to the navigation ECU 20.

(B) The HV control circuit 10 acquires as needed a generator electricity consumption threshold value and an assist electricity consumption threshold value, which are outputted from the navigation ECU 20. The generator electricity consumption threshold value and the assist electricity consumption threshold value are examples of a control index value about the charge and discharge of the battery 9. The SOC (State of Charge) is an index for indicating a remaining battery quantity. A higher value indicates a larger remaining quantity. The present SOC indicates the SOC of the battery 9 at the present time. The HV control circuit 10 repeatedly updates a value of the present SOC by serially detecting states of the battery 9.

(C) Based on the present accelerator opening, vehicle velocity, etc., a request driving power SPw required for the travel of the vehicle is computed. In addition, a request electric power transfer amount BPwref is computed. Here, the request electric power transfer amount may be referred to as a request electric power delivery and reception amount. Based on these request driving power SPw and the request electric power transfer amount BPwref, target torques of the electric generator 2 and the motor 3 are determined. The electric generator 2 and the motor 3 are controlled to realize the target torques, respectively. The method for calculating the target torques of the electric generator 2 and the motor 3 based on the request driving power SPw and the request electric power transfer amount BPwref is described in detail in Patent document 1.

In addition, the request electric power transfer amount BPwref is computed based on (i) the newest control index value (generator electricity consumption threshold value and assist electricity consumption threshold value) acquired from the navigation ECU 20 and (ii) the present request driving power SPw. The calculation method of such a request electric power transfer amount BPwref is also described in detail in Patent document 1.

Furthermore, for the battery temperature control 10b, the HV control circuit 10 stores a battery upper limit temperature, a battery input limit value Win, and a battery output limit value Wout. In addition, the HV control circuit 10 processes the following (D), (E), (F), and (G).

(D) While controlling such that an electric power more than the battery input limit value Win is not inputted from the electric generator 2 and the motor 3 to the battery 9, the HV control circuit 10 controls such that electric power more than the battery output limit value Wout is not outputted from the battery 9 to the motor 3.

For example, the distribution of the resistance of the oil brake and the resistance of the motor 3 is adjusted at the time of deceleration of the hybrid vehicle (at the time of regeneration). In detail, the resistance of the oil brake is controlled such that the electric power supplied to the battery 9 from the motor 3 does not exceed the battery input limit value Win.

For instance, in cases that a target deceleration amount is determined based on an amount of stepping-in of the brake pedal (unshown) etc., the following equation is effective

[Deceleration by the motor 3=Target deceleration amount−Deceleration by the oil brake].

If the deceleration by the motor is reduced by increasing the deceleration by the oil brake, the electric generation of the motor 3 decreases, decreasing the input to the battery 9.

More specifically, when the target deceleration amount can be realized by the motor 3 alone (i.e., without the motor 3 exceeding the battery, input limit value Win), the amount of deceleration by the oil brake is made zero. When the target deceleration amount cannot be realized by the motor 3 alone (i.e., without the motor 3 exceeding the battery input limit value. Win), the control is made as follows. Of all the target deceleration amount, an amount of deceleration realized by motor 3 is determined under the condition of the battery input limit value Win; the remaining amount of deceleration of all the target deceleration amount is realized by the oil brake.

In addition, for example, the distribution of the driving power by the motor 3 and driving power by the engine 1 is adjusted at the time of acceleration of the hybrid vehicle in the assist travel mode. In detail, the driving power of the motor 3 is controlled such that the electric power supplied from the battery 9 to the motor 3 does not exceed the battery output limit value Wout.

That is, in cases that a target acceleration amount is determined based on an amount of stepping-in of the accelerator pedal (unshown) etc., the following equation is effective

[Acceleration by the motor 3=Target acceleration− Acceleration by the engine 1].

If the acceleration by the motor 3 is reduced, the output power from the battery 9 decreases consequently.

Such a control enables the maximum of the input electric power to the battery 9 to be held down to the battery input limit value Win, and the maximum of the output electric power from the battery 9 to be held down to the battery output limit value Wout.

(E) The HV control circuit 10 detects or specifies the present temperature of the battery 9 periodically based on the signal from the battery temperature sensor 17, and notifies the navigation ECU 20 of the present battery temperature Tc as the specified result.

(F) Comparison is made between the battery upper limit temperature and the present battery temperature. When the present battery temperature is equal to or greater than the battery upper limit temperature, the cooling control is made. In the cooling control, while operating the battery cooling fan 16 with the maximum output, the battery restriction strengthening control is executed. In the battery restriction strengthening control, while the battery input limit value Win is set to a restriction strengthening value Win1, which is lower than the default value Win0 (for example, ½ of the default value Win0), the battery output limit value Wout is set to the restriction strengthening value Wout1, which is lower than the default value Wout0 (for example, ½ of the default value Wout0).

It is noted that those restriction strengthening values Win1, Wout1 may be constant regardless of the relation between the present battery temperature and the battery upper limit temperature; in contrast, those values Win1, Wout1 may be smaller as the calculation result of the subtraction of the batter upper limit temperature from the present battery temperature is larger. In the latter case, the cooling effect can be increased as the temperature of the battery 9 increases.

Such a cooling control is executed to prevent the following. That is, when the temperature of the battery 9 rises too much, degradation or deterioration of the battery 9 becomes intense, and it becomes impossible for the battery 9 to execute a charge and discharge as an intended control. In other words, in order that the degradation of the battery 9 can be suppressed and the battery 9 can execute a charge and discharge as an intended control, the battery cooling fan 16 is rotated and the upper limit of the input and output power relative to another electronic apparatus (the electric generator 2, the motor 3, auxiliary apparatus) in the battery 9 is reduced, under the battery restriction strengthening control, rather than a usual value (default value).

Further, when the present battery temperature is less than the battery upper limit temperature, the cooling control, if executed till then, is stopped. That is, while stopping the battery cooling fan 16 and setting the battery input limit value Win to the default value Win0, the battery output limit value Wout is set to the default value Wout0.

(G) The HV control circuit 10 changes the value of battery upper limit temperature based on the control from the navigation ECU 20. It is noted that the default value (i.e., the value in the case that a target battery temperature has not been inputted yet from the navigation ECU 20) of the battery upper limit temperature is 40° C. (degree centigrade), for example. Hereinafter, the default value of the battery upper limit temperature is referred to as a default battery upper limit temperature.

The GPS sensor 11, the direction sensor 12, and the vehicle velocity sensor 13 are known sensors that are used to respectively detect a position, a driving direction, and a travel velocity of the hybrid vehicle.

The gradient sensor 15 is configured by using a gyro sensor (not shown) which detects directional variations of the pitch direction, yaw direction, and roll direction of the vehicle. A road gradient or inclination (i.e., in a vertical direction) can be calculated from the directional variation of the pitch direction detected by the gyro sensor.

The map DB storage device 14 is a storage medium for storing map data. The map data contains (i) node data corresponding to each of intersections and (ii) link data corresponding to each link, that is, a road path connecting intersections with each other. The node data contain, with respect to each node, an identification number, location information, and type information. The link data contains, with respect to each link, an identification number (also referred to as a link ID), location information, road type information (such as highway, national highway, prefectural road, and thin street), and average gradient information, etc.

The position information about the link contains (i) location data of shape supplementing points contained in the link, (ii) data of the nodes located in the both ends of the link, and (iii) data of segments connecting two adjacent shape supplementing points. Each of the data of the segments contains information such as a segment ID of each segment, a (vertical) gradient, a direction, and a length of the segment.

Figure 2:
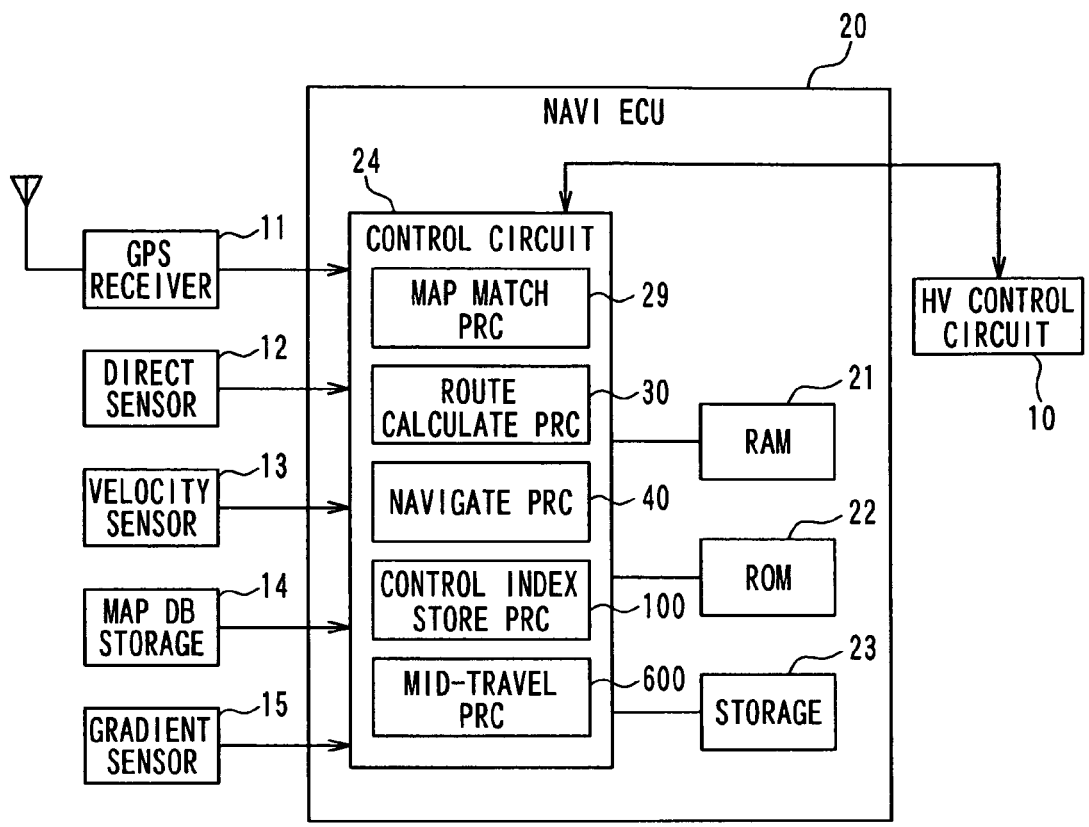
FIG. 2 is a diagram illustrating a configuration of a navigation ECU.

As shown in FIG. 2, the navigation ECU 20 includes RAM 21, ROM 22, a durable storage medium 23 capable of writing data, and a control circuit 24. The durable storage medium 23 can continuously maintain data even when a supply of main power to the navigation ECU 20 stops. The durable storage medium 23 represents, for example, a nonvolatile storage medium such as a hard disk, flash memory, and EEPROM, and backup RAM.

The control circuit 24 performs a program read from the ROM 22 or the durable storage medium 23. At this time, the control circuit 24 reads information from the RAM 21, the ROM 22, and the durable storage medium 23. The control circuit 24 writes information to the RAM 21 and the durable storage medium 23. The control circuit 24 exchanges signals with the HV control circuit 10, the GPS receiver 11, the direction sensor 12, the vehicle velocity sensor 13, the map DB storage device 14, and the gradient sensor 15.

For instance, the control circuit 24 performs specified programs to implement a map matching process 29, a route calculation process 30, a navigation process 40, a control index value storing process 100, and a mid-travel process 500.

In the map matching process 29, the control circuit 24 acquires information from the GPS receiver 11, the direction sensor 12, and the vehicle velocity sensor 13. Based on the acquired information, it is determined which road in a map stored in the map DB storage device 14 the present position corresponds to.

In the route calculation process 30, the control circuit 24 uses map data to determine an optimal route to a specified destination based on a destination specification by a user. The user specifies a destination using an unshown manipulation device.

In the navigation process 40, the control circuit 24 executes a guidance display for driving the hybrid vehicle along a travel route up to a destination (i.e., end point) for a driver via an image display apparatus, a speaker, etc. which are not illustrated.

In the control index value storing process 100, the control circuit 24 collects first information and second information for every fixed time period (e.g., every one second) and stores the collected information in the durable storage medium 23 as a travel history. The first information may be also referred to control index specifying information, which is information for specifying a control index value in a travel up to a destination from a start point. The second information may be also referred to as road range extracting information, which is information for extracting a road range in which a predetermined fuel mileage enhancement effect is estimated to be obtained by specifying a schedule of a control index value to execute a travel control of the engine and the motor. Thereby, based on the second information stored in the durable storage medium 23, a schedule effect road range (i.e., an example of an estimate road range) in which a predetermined fuel mileage enhancement effect can be acquired by specifying a schedule of a control index value is extracted from within a road route from the start point to the destination. Further, using the first information stored in the durable storage medium 23, a schedule of the control index value is specified with respect to each of road divisions of the extracted schedule effect road range so as to decrease a fuel consumption of the engine and the specified schedule of the control index is stored in the durable storage medium 23. In addition, in a mid-travel process illustrated in FIG. 13 mentioned later, at the next departure, a determination is made as to whether an identical route from a start point to a destination is stored in the storage medium 23 and, furthermore, a schedule of the control index value of the identical route is also stored in the storage medium 23. When such a determination is affirmed, the execution of the drive control of the engine and the motor according to the schedule of the control index value stored in the durable storage medium 23 can enable a vehicle travel according to the specified schedule of the control index value with a high accuracy.

Figure 3:
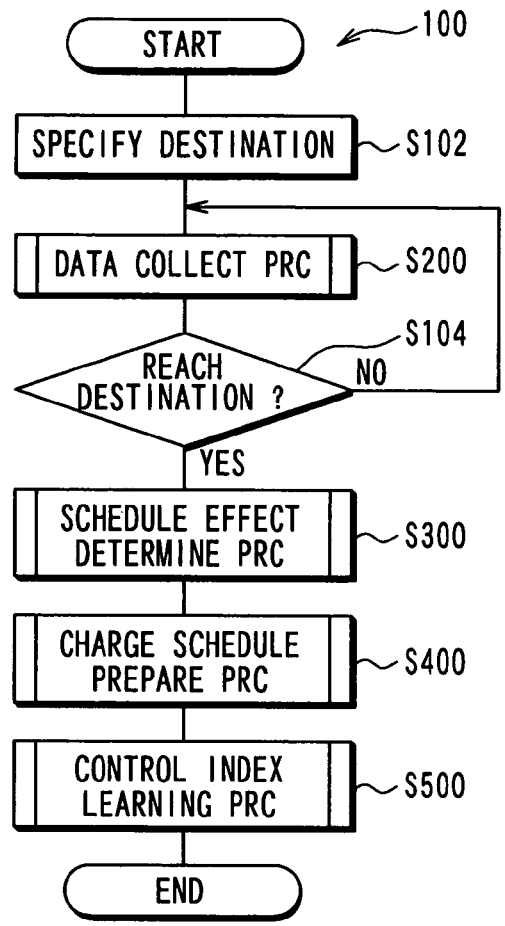
FIG. 3 is a flowchart illustrating a control index value storing process.

FIG. 3 is a flowchart illustrating a control, index value storing process 100. When the ignition switch of the vehicle is turned on, the present in-vehicle charge and discharge control apparatus becomes in an operating state and the control circuit 24 executes various processes. The control circuit 24 executes a process illustrated in FIG. 3 according to the occupant's manipulation.

It is further noted that a flowchart or the processing of the flowchart in the present application includes sections (also referred to as steps), which are represented, for instance, as S110. Further, each section can be divided into several subsections while several sections can be combined into a single section. Furthermore, each of thus configured sections can be referred to as a means or unit and achieved not only as a software device but also as a hardware device.

First, a destination (i.e., an end point) is specified (S102). In detail, a display window in which to request an input of a destination appears. A spot or facility indicated by the manipulation of the occupant in the display window is specified as a destination.

Next, until the subject vehicle reaches the destination (S104), a data collection process for collection travel information is repeatedly executed (S200). In the present embodiment, the repeating cycle of the data collection process is one second, for instance, but it may be other than one second as needed.

However, when the subject vehicle stops, the execution or repetition of the data collection process is also stopped. That is, in the present embodiment, the data collection process can be repeatedly executed as long as the subject vehicle runs. Alternatively, even when the subject vehicle stops, the data collection process can be repeatedly executed as another example.

Hereinafter, a road division which is traveled by the subject vehicle in a duration of one cycle of the data collection process is referred to as a unit road division. Whether the subject vehicle reaches the destination is determined based on whether a present position of the subject vehicle is within a predetermined range centering on the destination.

Figure 4:
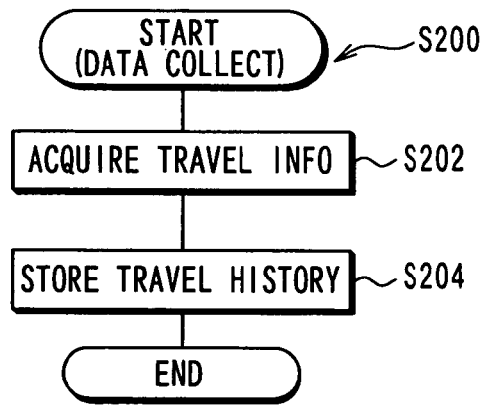
FIG. 4 is a flowchart illustrating a data collection process.

The flowchart of the data collection process S200 is illustrated in FIG. 4. In the data collection process S200, the control circuit 24 first acquires travel information (S202). Here, the travel information includes a clock time (unit of second) at the time of the acquisition, a vehicle velocity (unit of km/h), a road gradient (grade) (unit of %), a driving power (unit of kW), an electric load to drive the motor 3 (unit of W), and a battery temperature (unit of ° C.) of the battery 9 obtained from the battery temperature sensor 17. In addition, immediately after completing of traveling the whole of a single link or the whole of a single segment, a travel time (second) required for traveling the single link or segment and a stop ratio (%) in the single link or segment are collected. The stop ratio (%) is a ratio of the total stop time (second) to the travel time (second) with respect to a corresponding road range.

It is noted that the driving power is a power required for driving the vehicle. The driving power of a positive value and the driving power of a negative value are computable by the following equations, respectively.

$$\text{Driving power [kW] of the positive value} = \text{Axle torque [Nm]} \times \text{Axle number of rotations [rpm]} \times 2\pi/60/1000.$$

$$\text{Driving power [kW] of the negative value} = \text{Braking torque [Nm]} \times \text{Axle number of rotations [rpm]} \times 2\pi/60/1000.$$

Further, the detail of the calculation method of the driving power may use those described in paragraph 0045 of Patent document 1. The vehicle travel load P in Patent document 1 is equivalent to the driving power of the present application.

Of the collected information, the vehicle velocity (km/h), the road grade (%), and the driving power (kW) correspond to the first information; the road grade (%), the travel time (second) within a road range, the stop ratio (%) within a road range, an electric load (W) to drive the motor 3, and the vehicle velocity (km/h) correspond to the second information. In addition, at S202, the road identifier of the road in which the subject vehicle is located is specified simultaneously.

Next, the travel history is stored (S204). In detail, the first and second information collected at S202 are stored in the durable storage medium 23 in association with the road identifier of the road the subject-vehicle is located.

An example of the first information stored in the durable storage medium 23 is illustrated in FIG. 5. Thus, the vehicle velocity, road grade, and driving power, all of which are collected for every fixed cycle (e.g., one second in the present example) are stored in the durable storage medium 23 in association with the road identifier. The road identifier is a link ID or a segment ID for identifying the road.

Figure 6:
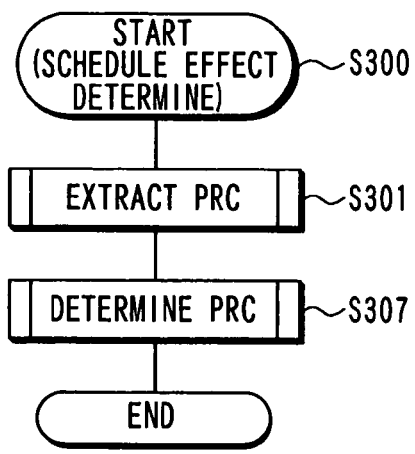
FIG. 6 is a flowchart illustrating a schedule effect determination process.

Returning to FIG. 3, when the subject vehicle arrives at the destination, the determination at S104 is affirmed as YES, starting the execution of a schedule effect determination process S300. The flowchart of the schedule effect determination process S300 is illustrated in FIG. 6. In this schedule effect determination process S300, first, an extraction process S301 is executed to extract a candidate of a schedule effect road range within a road route from a start point (i.e., a departure point) to an end point (i.e., destination) based on a variety of information relative to the vehicle travel. The schedule effect road range can be defined as a "road range in which an effect of a predetermined fuel mileage enhancement is acquirable by specifying a schedule of a target value." Such a road range is configured of a series of several unit road divisions, which are serially or continuously connected.

In the present embodiment, the following road ranges illustrated in (1) to (3) are regarded as candidates of a schedule effect road range that is a "road range in which an effect of a predetermined fuel mileage enhancement is acquirable by specifying a schedule of a target value." A candidate road range is extracted which corresponds to each of (1) to (3) within a route from the start point to the end point.

(1) A road range has a length equal to or greater than a predetermined threshold value with a downward inclination of an average gradient equal to or less than a threshold value.

(2) A road range has a travel time equal to or greater than a predetermined threshold value with a stop ratio equal to or greater than a predetermined threshold value and an electric load to drive the motor 3 equal to or greater than a predetermined threshold value.

(3) A road range has a travel time equal to or greater than a predetermined threshold value with an average vehicle velocity equal to or less than a predetermined threshold value.

Figure 7:
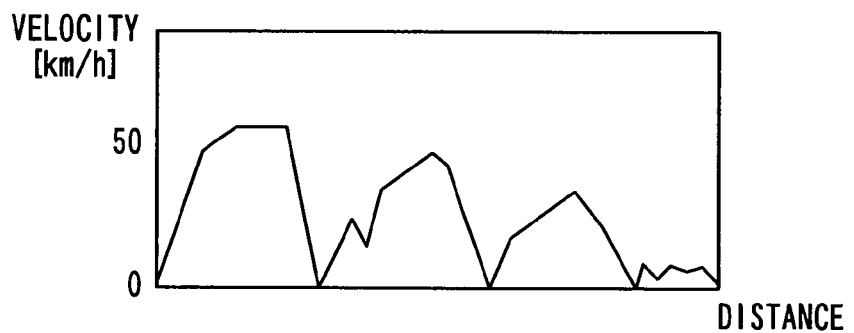
FIG. 7 is a diagram illustrating an example of a time-based change in vehicle velocities.
Figure 8:
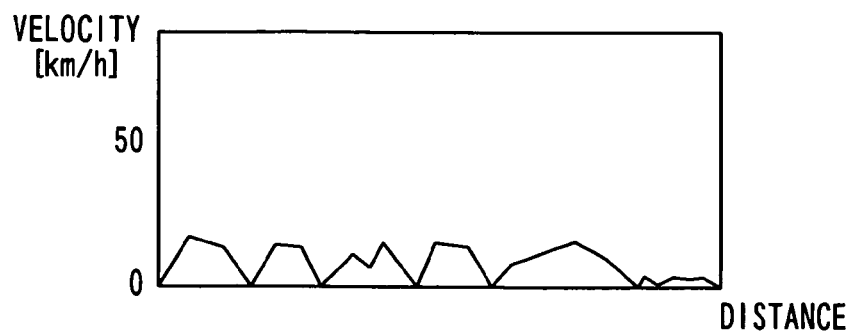
FIG. 8 is a diagram illustrating another example of a time-based change in vehicle velocities.

Those are estimated to be road ranges in which to provide an estimate of an effect of a predetermined fuel mileage enhancement acquired by specifying a schedule of the control index value. A typical example of a road range corresponding to (1) is a long downward slope or inclination. A typical example of a road range corresponding to (2) is a stop and go road range in which a deceleration, a stop, and an acceleration occur frequently. A road range being a congestion road range with a high stop ratio but a relatively high vehicle velocity during the running is a road range corresponding to (2). An example of a time-based change of the vehicle velocities in a road range corresponding to (2) is illustrated in FIG. 7. A typical example of a road range corresponding to (3) is a congestion road range where a low vehicle velocity continues. An example of a time-based change of the vehicle velocities in a road range corresponding to (3) is illustrated in FIG. 8. It is noted that FIG. 7 and FIG. 8 have the axis of abscissa of a distance; the stop period is not illustrated. In fact, however, the vehicle stops at a point where the vehicle velocity is zero.

Figure 9:
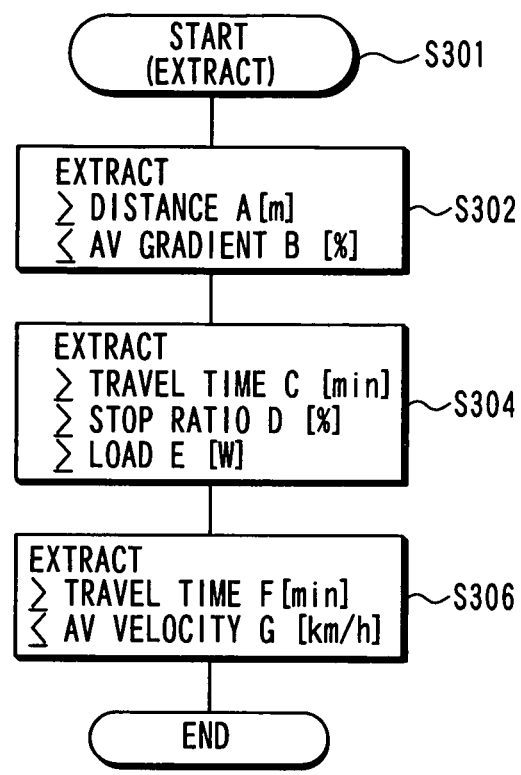
FIG. 9 is a flowchart illustrating an extraction process.

The extraction process to extract a candidate road range corresponding to each of (1) to (3) is, for instance, illustrated in FIG. 9. In detail, at S302, a road range corresponding to (1) is extracted as a candidate road range, from a route from a start point to an end point. At S304, a road range corresponding to (2) is extracted as a candidate road range, from the route from the start point to the end point. At S306, a road range corresponding to (3) is extracted as a candidate road range, from the route from the start point to the end point. The total of the extracted candidate road ranges may be zero, one, or more.

Then, a determination process at S307 in FIG. 6 is executed for every extracted candidate road range. If there is extracted no candidate road range, it is determined that there is no road range having an effect from a schedule, ending the schedule effect determination process.

Figure 10:
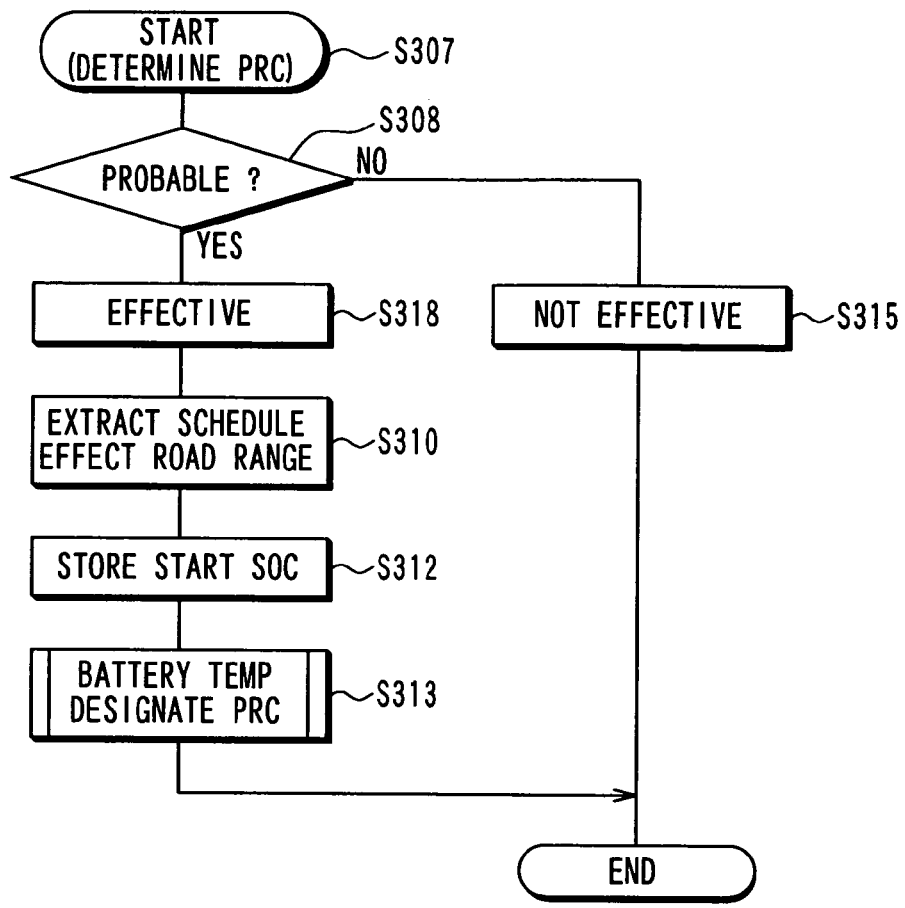
FIG. 10 is a flowchart illustrating a determination process.

The details of the determination process are illustrated in FIG. 10. First, it is determined whether each information (serving as second information) used in the extraction of (1) to (3) with respect to each candidate road range (hereinafter, also referred to as a target road range) is probable (S308). In the present embodiment, the probability is determined based on whether a standard deviation of the information used in the extraction of (1) to (3) with respect to each target road range is less than a predetermined threshold value. For example, suppose a case that a target road range corresponds to (1) is extracted at S302. In such a case, when a standard deviation of each of the length and the average gradient is less than a predetermined threshold value, it is determined that the information is probable.

Then, when the standard deviation of each information item is not less than the predetermined threshold value, the target road range is regarded as a road range in which an effect of a predetermined fuel mileage enhancement is not acquirable by specifying a schedule of a control index value," i.e., a road range without any schedule effect (S315). The determination process relative to such a target road range is ended.

In contrast, when the standard deviation of each information item is less than the predetermined threshold value, the target road range is regarded as a schedule effect road range, which is a road range in which an effect of a predetermined fuel mileage enhancement is acquired by specifying a schedule of a control index value" (S318). Such a target road range regarded as a schedule effect road range is stored in the durable storage medium 23 (S310). In detail, the route from the start point to the end point and the schedule effect road range included in the route are stored in the durable storage medium 23.

Figure 11:
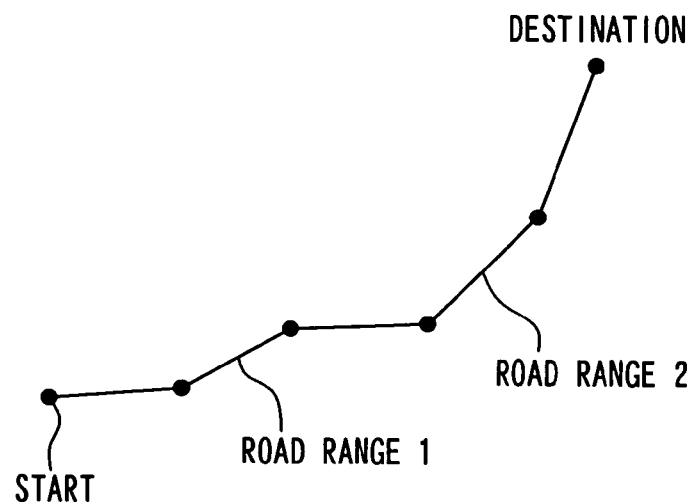
FIG. 11 is a diagram illustrating a schedule effect road range.

An example of the schedule effect road range thus stored is illustrated in FIG. 11. The diagram contains two schedule effect road ranges 1, 2 within a route from a start point to a destination.

Next, based on each information collected along with the travel of the vehicle, a start SOC of the target road range regarded as a schedule effect road range is determined; then, the determined start SOC is stored in the durable storage medium 23 (S312). Next, a battery temperature designation process is executed for the schedule effect road range (S313). The present process is then ended.

Figure 12:
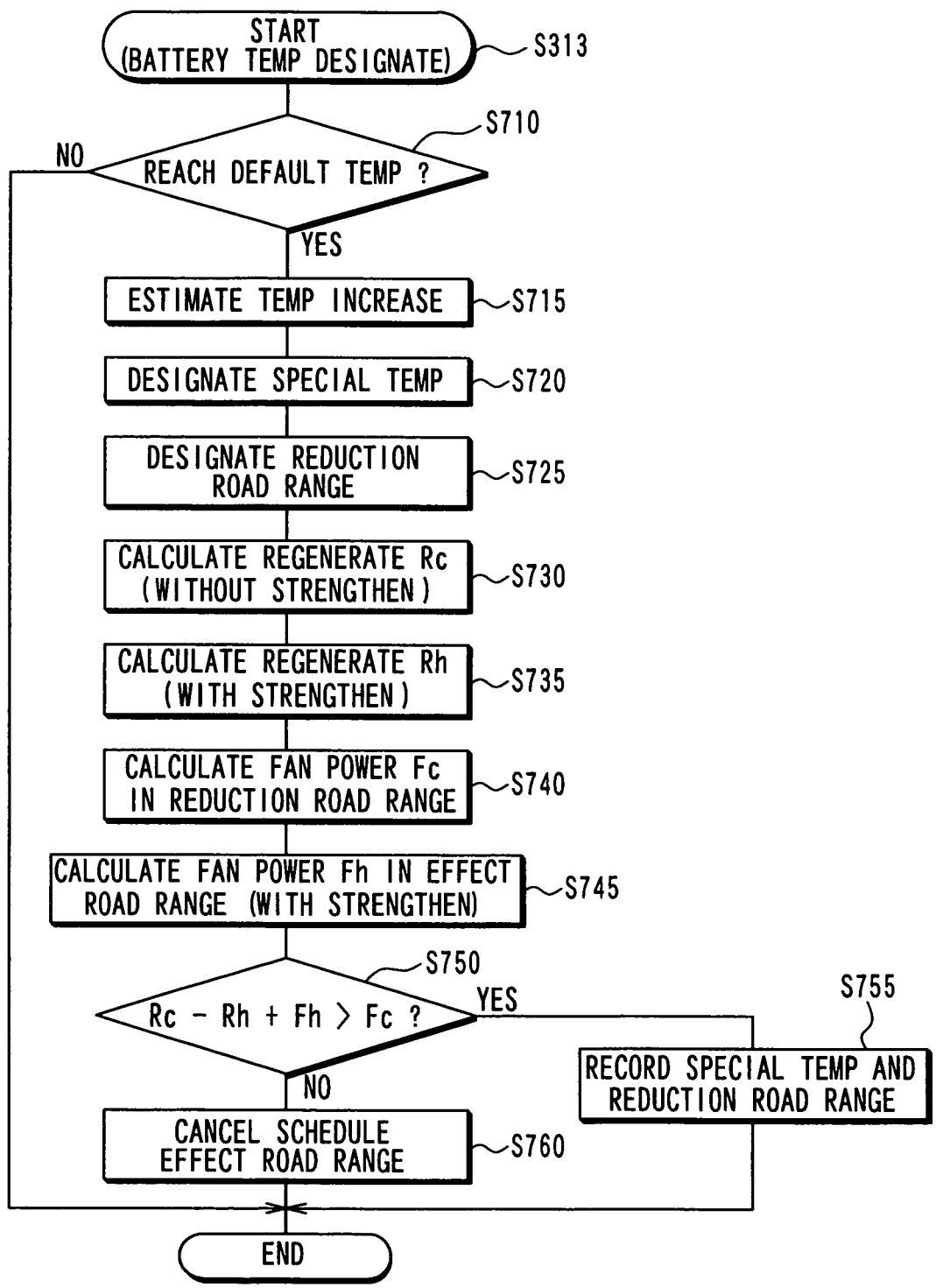
FIG. 12 is a flowchart illustrating a battery temperature designation process.

The following explains a battery temperature designation process at S313 in detail. FIG. 12 shows a flowchart of the battery temperature designation process. If the battery temperature rises too much in the schedule effect road range, the cooling control (in particular, the battery restriction strengthening control) will be executed. As a result, the charge and discharge of the battery 9 are no longer executed as an intended charge schedule to be mentioned later; thus, the charge schedule may become meaningless. Thus, in order not to cause the cooling control in the schedule effect road range, the battery temperature designation process is executed.

Figure 13:
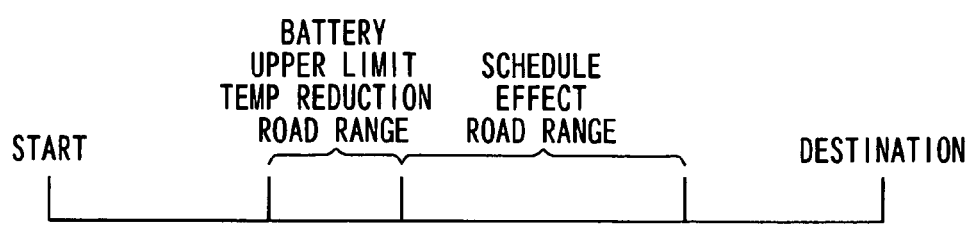
FIG. 13 is a diagram illustrating an example of a position relation between a schedule effect road range and a battery upper limit temperature reduction road range.

In the battery temperature designation process, as illustrated in FIG. 13, a battery upper limit temperature reduction road range is designated, as needed, which is designated just prior to the schedule effect road range to decrease, in the battery upper limit temperature reduction road range, the battery upper limit temperature adopted by the HV control circuit 10. In order to use as the battery upper limit temperature in the battery upper limit temperature reduction road range, a special battery upper limit temperature (i.e., a special value of the battery upper limit temperature) is designated. In order to realize such a control, the control circuit 24 executes as follows.

First, at S710, a travel history recorded in the data collection process of FIG. 4 with respect to a target schedule effect road range (hereinafter referred to as a target road range) is read. It is determined whether the battery temperature included in the read travel history became equal to or greater than a default battery upper limit temperature (i.e., a default value of the battery upper limit temperature, e.g., 40° C. in the present embodiment) within the target road range. For example, in the travel history illustrated in FIG. 5, there are unit road divisions where the battery temperature turned into equal to or greater than the default battery upper limit temperature.

When it is determined that there was a case that the battery temperature became equal to or greater than the default battery upper limit temperature, the subsequent S715 is executed. When it is determined that there was not such a case, it is unnecessary to designate any battery upper limit temperature reduction road range, thereby ending the battery temperature designation process.

At S715, a temperature increase in the battery 9 with respect to the target road range is estimated. Here, the temperature increase signifies an elevation temperature, which is generated if the battery 9 obtains all the energy obtained by the regeneration under the state where any cooling control (in particular, the battery restriction strengthening control) is not executed in the schedule effect road range.

Further, the temperature increase cannot be estimated only from the travel history recorded in the data collection process of FIG. 4 with respect to the schedule effect road range. It is because the battery temperature turned into equal to the default battery upper limit temperature at least once in the schedule effect road range in the travel history, so the battery restriction strengthening control was executed and the temperature of the battery was suppressed.

Then, a temperature increase is estimated using the following equation:

Temperature increase [° C.]=Temperature rise rate [° C./s]×Regeneration time [s] in Schedule effective road range.

Here, the temperature rise rate is a value which is predetermined at the time of the installation of the navigation ECU 20 into the vehicle, and recorded in the ROM 22 etc. When recording, for every vehicle in which the navigation ECU 20 is mounted, an input electric current to the battery 9 is measured at the time of acquiring the maximum regeneration amount (namely, default value Win0 of the battery input limit value Win). The temperature rise amount per a unit of time (e.g., one second) in the battery 9 when the input of the input current is continued for the unit time is measured. The measured temperature rise amount is recorded as a temperature rise rate.

The regeneration time in the schedule effect road range is obtained as follows. That, is, the sum total of the regeneration amount acquired in the schedule effect road range without the cooling control (in particular, the battery restriction strengthening control) is divided by the maximum regeneration power (namely, the default value Win0 of the battery input limit value Win), which is acquirable for a unit time (e.g., 1 second), to thereby obtain the regeneration time.

To compute the sum total of the regeneration amount acquired in this schedule effect road range without any cooling control, the travel history recorded in the data collection process of FIG. 4 about the schedule effect road range is read, and, of the driving powers in the read travel history, a driving power having a negative value is used.

Figure 14:
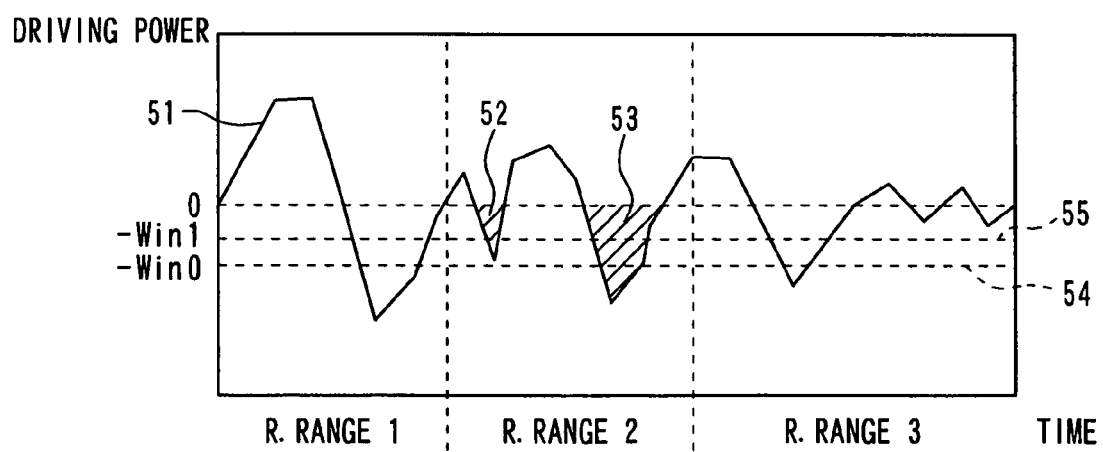
FIG. 14 is a diagram illustrating a history of a driving power in a schedule effect road range.

For example, the driving power recorded as a travel history by the data collection process of FIG. 4 is illustrated in the graph 51 in FIG. 14. In the case that the schedule effect road range is the road range 2, the sum total of the area of the portions 52 and 53 illustrated in the slash is the absolute value of the time integration value of the driving power 51 in the range in which the driving power 51 is negative in the schedule effect road range 2.

The sum total of the area of these portions 52 and 53 is an electrical power amount which should be acquired by regeneration, if any restriction is not applied to the battery 9. However, actually, even if it is the case where the battery restriction strengthening control is not executed, an electric power not less than the default value Win0 of the battery input limit is unacquirable.

When the line 54 which illustrates the value −Win0 which is obtained by multiplying the default value Win0 of the battery input limit by −1, the sum total of the regeneration amount which is acquired without any cooling control (in particular, the battery restriction strengthening control) in the schedule effect road range is considered as an area excluding the portion lower from the line 54 from the area of the portions 52, 53.

The temperature variation amount of the battery 9 is obtained by carrying out the multiplication of the square of the resistance value R of the battery 9 to the current value I entering in the battery 9. Since the resistance value R of the battery 9 seldom changes at a normal temperature, the temperature variation amount of the battery 9 is also almost constant under the current value I being constant. Therefore, the temperature increase can be also estimated to be an amount proportional to the regeneration time in the schedule effect road range.

Then, at S720, a special value of the battery upper limit temperature (i.e., a special battery upper limit temperature) of the battery 9 is designated such that the battery temperature at the start point of the schedule effect road range should be suppressed under the default value. In detail, the special battery upper limit temperature is set to or designated as a temperature value, i.e., a difference obtained by subtracting the temperature increase calculated at S715 from the default battery upper limit value. For example, when the temperature rise rate is 0.2° C./s and the regeneration time is 25 seconds, the temperature increase is 5° C. Thus, the special battery upper limit temperature is 35° C. (=40° C.-5° C.).

Then, at S725, the battery upper limit temperature reduction road range is designated. In detail, with reference to the battery temperature in the travel history, the start point of the battery upper limit temperature reduction road range is designated at a first point at which the battery temperature rises to the special battery upper limit temperature most recently before entering the schedule effect road range (i.e., the first point, which is closest to (the start point of) the battery upper limit temperature reduction road range, and at which the battery temperature rises to the special battery upper limit temperature). The end point of the battery upper limit temperature reduction road range is designated to accord with the start point of the schedule effect road range.

For example, with reference to the travel history as shown in FIG. 5, the road identifiers 01 to 04 indicate the schedule effect road ranges. The point at which the battery temperature reaches 35° C. in the identifier 00 is defined as the start point of the battery upper limit temperature reduction road range. The point of the beginning of the road identifier 01 is defined as the end point of the battery upper limit temperature reduction road range.

In S730 to S745, various physical quantities are calculated which are used as an index to execute a determination as to which of two first and second cases provides more energy, the first case where a battery upper limit temperature reduction road range is designated, the second case where a battery upper limit temperature reduction road range is not designated.

In detail, at S730, a regeneration amount Rc acquirable in a schedule effect road range (the dimension is an electrical power amount) is calculated in the case that the cooling control (in particular, the battery restriction strengthening control) in the schedule effect road range is no longer executed by providing the battery upper limit temperature reduction road range, in the case that any battery restriction strengthening control is not executed.

In order to compute the regeneration amount Rc, the travel history recorded in the data collection process of FIG. 4 about the schedule effect road range is read, and the driving power of a negative value is used from the driving powers in the read travel history. For example, the driving power recorded as a travel history by the data collection process of FIG. 4 is illustrated in the graph 51 in FIG. 14. In the case that the schedule effect road range is the road range 2, the line 54 is designated which indicates the battery input restriction strengthening value −Win0 which is obtained by multiplying the default value Win0 of the battery input limit value by −1. The regeneration amount Rc that is acquirable in the case of precluding the battery restriction strengthening control is designated as the area excluding the portion lower from the line 54 from the area of the portions 52, 53.

Then, at S735, a regeneration amount Rh acquirable in a schedule effect road range (the dimension is an electrical power amount) is calculated in the case that the cooling control (in particular, the battery restriction strengthening control) in the schedule effect road range is executed by not providing any battery upper limit temperature reduction road range, i.e., in the case that the battery restriction strengthening control is executed.

In order to compute the regeneration amount Rh, the travel history recorded in the data collection process of FIG. 4 about the schedule effect road range is read, and the driving power of a negative value is used from the driving powers in the read travel history. For example, the driving power recorded as a travel history by the data collection process of FIG. 4 is illustrated in the graph 51 in FIG. 14. In the case that the schedule effect road range is the road range 2, the line 55 is designated which indicates the battery input restriction strengthening value −Win1 which is obtained by multiplying the default value Win1 of the battery input limit value by −1. The regeneration amount Rh that is acquirable in the case of including or executing the cooling control (in particular, the battery restriction strengthening control) is designated as the area excluding the portion lower from the line 55 from the area of the portions 52, 53.

Figure 15:
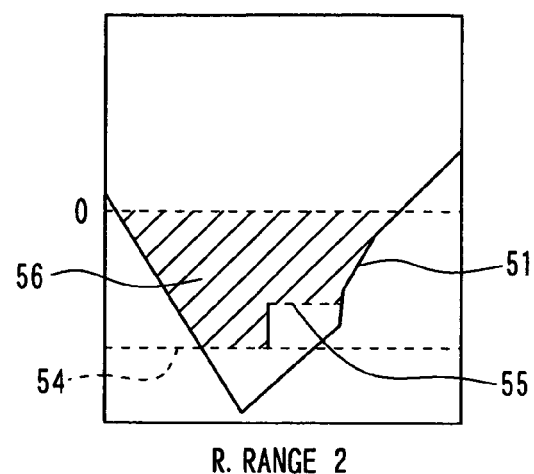
FIG. 15 is a diagram illustrating a history of a driving power in a schedule effect road range.

It is noted that there is only a part of range where the temperature of the battery 9 is the default battery upper limit temperature or more in the travel history in the schedule effect road range 2. As illustrated in FIG. 15, the line 55 is designated only to correspond to such a part. Thereby, the regeneration amount Rh acquirable in the case of executing the cooling control (in particular, the battery restriction strengthening control) can be defined as an area 56 as follows. That is, the part below the line 54 of value −Win0 is excluded from the area of the portions 52 and 53 and, then, the part below the line 55, when existing, is further excluded to thereby obtain the area 56.

It is noted that the line 55 which illustrates the value −Win1 is a horizontal straight line when the restriction strengthening value Win1 is constant. In contrast, when the restriction strengthening value Win1 changes or is not fixed according to the temperature of the battery, it may be a tilted straight line or a curve.

Then, at subsequent S740, a maximum electric power amount Fc is calculated which is required for an operation of the battery cooling fan 16 in the battery upper limit temperature reduction road range. This maximum electric power amount Fc can be obtained by multiplying the travel time [s] of the battery upper limit temperature reduction road range (i.e., a period of the travel of the battery upper limit temperature reduction road range) by the power consumption [W] at the time of operating the battery cooling fan 16 at the maximum output. The travel time of the battery upper limit temperature reduction road range can be specified from the clock time information recorded in the battery upper limit temperature reduction road range in the travel history.

At subsequent S745, a consumed electric power amount Fh of the battery cooling fan 16 operated at the maximum output at the time of cooling control is computed in the case that the cooling control in the schedule effect road range is executed by not providing the battery upper limit temperature reduction road range.

The consumed electric power amount Fh can be obtained by carrying out the multiplication of the time [s] during which the cooling control was executed in the schedule effect road range by the power consumption [W] at the time of operating the battery cooling fan 16 at the maximum output. The time during which the cooling control was executed in the schedule effect road range can be specified from the clock time information recorded in the road range where the cooling control was executed in the travel history.

Then, at S750, it is determined whether an inequality (Rc−Rh+Fc>Fh) is satisfied using the amounts Rc, Rh, Fc, and Fh computed in S730 to S745.

In detail, the left side of the inequality represents an expression in which, from the regeneration amount Rc acquirable in the schedule effect road range without the cooling control (in particular, the battery restriction strengthening control), the regeneration amount Rh acquirable in the schedule effect road range with the cooling control (in particular, the battery restriction strengthening control) is subtracted, and the consumed electric power amount Fh in the schedule effect road range of the battery cooling fan with the cooling control is then added. Therefore, the left side is an amount of energy which the battery 9 gains additionally when the battery upper limit temperature reduction road range is provided and the cooling control is not executed.

In contrast, the right side of the inequality is a consumed electric power amount Fc of the battery cooling fan 16 in the battery upper limit temperature reduction road range in the case of having no cooling control. Therefore, the right side is an amount of energy which the battery 9 gains additionally when the battery upper limit temperature reduction road range is not provided and the cooling control is not executed.

Therefore, the above inequality is satisfied when the energy gained by the battery 9 in the case of having the battery upper limit temperature reduction road range is more than that in the case of not having the battery upper limit temperature reduction road range. In other words, the inequality is satisfied when the battery 9 can accumulate more energy with the battery upper limit temperature reduction road range being provided).

For example, in almost all cases, in a long downward slope, the more energy can be gained by the battery 9 in the case of providing the battery upper limit temperature reduction road range than that in the case of not providing.

However, with respect to a traffic congestion road range, whether to gain more energy by providing the battery upper limit temperature reduction road range is dependent on the vehicle velocity in the traffic congestion road range.

Figure 16:
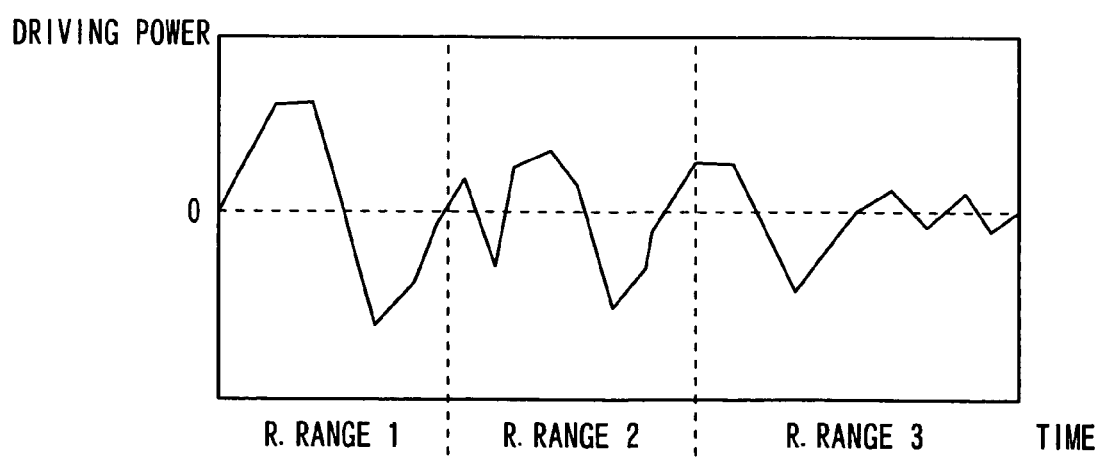
FIG. 16 is a diagram illustrating an example of a time-based change in a driving power.

That is, as illustrated in FIG. 7, even in the traffic congestion, there may be a case where the velocity during running is relatively high. In such a case, as illustrated in FIG. 16, in the schedule effect road range (road ranges 1, 2, and 3), the electric power which can be regenerated at the time of deceleration (namely, an absolute value of the driving power having a negative value out of the driving powers) becomes great. Such a case provides a possibility the an energy gained by the battery 9 in the case of providing the battery upper limit temperature reduction road range is higher than that in the case of not providing it.

However, as illustrated in FIG. 8, in the case that the velocity during running is low by the traffic congestion, the electric power which can be regenerated in the schedule effect road range (road ranges 1, 2, and 3) at the time of deceleration is small primarily. Such a case may provide a situation that an energy gained by the battery 9 in the case of providing the battery upper limit temperature reduction road range is smaller than that in the case of not providing it.

When the above inequation, is satisfied, S755 is executed subsequently. At S755, the special battery upper limit temperature and the battery upper limit temperature reduction road range are associated with the present schedule effect road range and stored in the durable storage medium 23. The battery temperature designation process is then ended. Thus, to be mentioned later, in the battery upper limit temperature reduction road range prior to the schedule effect road range, the control is made such that the upper limit of the temperature of the battery 9 is suppressed to be lower than a usual value (default value).

Such a configuration enables the selection of a case that more energy can be accumulated in the battery 9; the control can be made such that the battery upper limit temperature is temporarily reduced in the battery upper limit temperature reduction road range. The battery 9 is thus enabled to accumulate energy more efficiently.

When the above inequation is not satisfied, S760 is subsequently executed. At S760, the present schedule effect road range is canceled. That is, the present schedule effect road range is considered to be not an actual schedule effect road range. In detail, the present schedule effect road range is deleted from the durable storage medium 23. Thereby, a charge schedule (control index value) is no longer prepared about the cancelled former schedule effect road range. After S760, the battery temperature designation process is then ended.

Thus, when the above inequality is not satisfied, not only no battery upper limit temperature reduction road range is provided but also the schedule effect road range itself is canceled. This is because even if providing a battery upper limit temperature reduction road range, the battery 9 does not necessarily gain energy. Further, if the battery upper limit temperature reduction road range is not provided, the charge and discharge as planned become impossible in the schedule effect road range. The meaning of making a charge plan in the schedule effect road range itself fades away.

Thus, the above battery temperature designation process is executed for every schedule effect road range. Of the schedule effect road ranges, one is assigned with the battery upper limit temperature reduction road range which is designated just prior to the one, as illustrated in FIG. 13 (see S755); one is assigned with no battery upper limit temperature reduction road range (S710→NO); and one is canceled to be no longer a schedule effect road range (see S760).

Thus, only when the temperature of the battery 9 became the default value of the battery upper limit temperature or more in the travel history of the schedule effect road range, the battery upper limit temperature reduction road range is designated. Thereby, the control can be made such that the battery upper limit temperature is temporarily reduced in the battery upper limit temperature reduction road range. For instance, suppose the case (for example, when running in a cold area) that the temperature of the battery 9 may not turn into the battery upper limit temperature or more in the travel history of the schedule effect road range. Such a case therefore reduces a possibility of uselessly reducing the battery upper limit temperature temporarily, enabling the battery 9 to accumulate energy still more efficiently.

Figure 17:
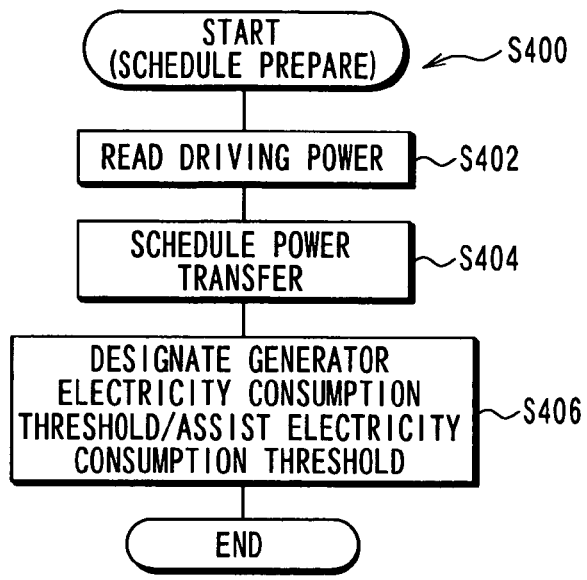
FIG. 17 is a flowchart illustrating a charge schedule preparation process.

After the battery temperature designation process is completed, S400 in FIG. 3 is executed. At S400, a charge schedule preparation process is executed with respect to each of the schedule effect road range. The flowchart of the charge schedule preparation process S400 is illustrated in FIG. 17. In the charge schedule preparation process S400 prepares a schedule or plan of a travel manner of the vehicle within a corresponding road range.

In detail, the driving power of the schedule effect road range is first read from the travel history (S402). Next, based on the read driving power, scheduling of an amount of electric power transfer (i.e., delivery and reception) is executed (S404). That is, each unit road division in the schedule effect road range is classified into a unit road division in which electric generation is executed and a unit road division in which assist is executed. In the unit road division in which to execute the electric generation, a generator electricity amount and a generator electricity consumption are designated; in the unit road division in which to execute the assist, an assist electricity amount and an assist electricity consumption are designated. The generator electricity consumption [g/Wh] is a ratio of a fuel consumption to an electric power generated by the generator 2 (or the motor 3) using the fuel consumption. The assist electricity consumption [g/Wh] is a ratio of a fuel consumption, which is reduced by an assist travel, to an electric power supplied by the battery 9 in the assist travel.

The method of scheduling an electricity transfer amount based on the driving power is described in detail in Patent document 1. The vehicle travel load P in Patent document 1 is equivalent to the driving power of the present application. The outline of the scheduling of the generator electricity consumption in each unit road division is explained in the following (C1) to (C4).

(C1) Multiple engine operation point candidates (engine rotation speed Ne and engine torque Te) in the case of outputting the driving power only using the engine 1 are calculated with respect to a unit road division. A fuel consumption is calculated for each of the calculated engine operation point candidates. The minimum fuel consumption of the calculated fuel consumptions is designated as a reference fuel consumption $Fg0$.

(C2) In the unit road division, the maximum value Wmax of an electric power amount which can be accepted by a power source group (namely, in the present embodiment, the battery 9 and auxiliary apparatus) is determined. The maximum value of the electrical power amount which can be accepted by the battery 9 is obtained by multiplying the default value Win0 of a battery input limit value Win by a travel time required for traveling the unit road division. The default value Win0 is the maximum value of the electric power amount which can be accepted by the battery 9 in a usual case, i.e., in the case of not executing the cooling control (in particular, in the case of not executing the battery restriction strengthening control). That is, the above maximum value is determined on a premise that any cooling control (in particular, a battery restriction strengthening control) is not executed in the schedule effect road range.

(C3) Several electric power amounts $Wmg[i]$ ($i=1, 2, \ldots, N2$) which are less than the maximum acceptable electric power amount Wmax are calculated. The electric generator 2 is driven such that each calculated $Wmg[i]$ may be generated. The engine operation point ($Neg[i], Teg[i]$) ($i=1, 2, ---, N2$) which also satisfies the driving power in the unit road division is calculated. The fuel consumption $Fg[i]$ ($i=1, 2, ---, N2$) of each engine operation point is then calculated.

(C4) With respect to each engine operation point ($Neg[i], Teg[i]$), a generator electricity consumption $Dg[i]$ ($i=1, 2, ---, N2$) is calculated from the following equation.

$$Dg[i]=(Fg[i]-Fg0)/Wmg[i].$$

Thus, the calculation of the generator electricity consumption is on the premise that any cooling control (in particular, a battery restriction strengthening control) is not executed in the schedule effect road range.

Then, based on the generator electricity consumption and assist electricity consumption in each unit road division posterior to the scheduling, a generator electricity consumption threshold value and an assist electricity consumption threshold value are calculated with respect to each unit road division in an index designation road range. The calculated generator electricity consumption threshold value and assist electricity consumption threshold value are stored in the durable storage medium 23 (S406).

It is noted that an index designation road range is one of several road portions which are formed by dividing a schedule effect road range; the index designation road range is longer than a unit road division. For example, one link may be equivalent to one index designation road range; one segment may be equivalent to one index designation road range. The method of designating the generator electricity consumption threshold value and assist electricity consumption threshold value for every index designation road range based on the generator electricity consumption and assist electricity consumption for every unit road division is described in detail in Patent document 1. In Patent document 1, the first section is equivalent to a unit road division; the second section is equivalent to an index designation road range.

Thus, as the control index value, the generator electricity consumption threshold value and assist electricity consumption threshold value are designated for every second section within the schedule effect road range.

Figure 18:
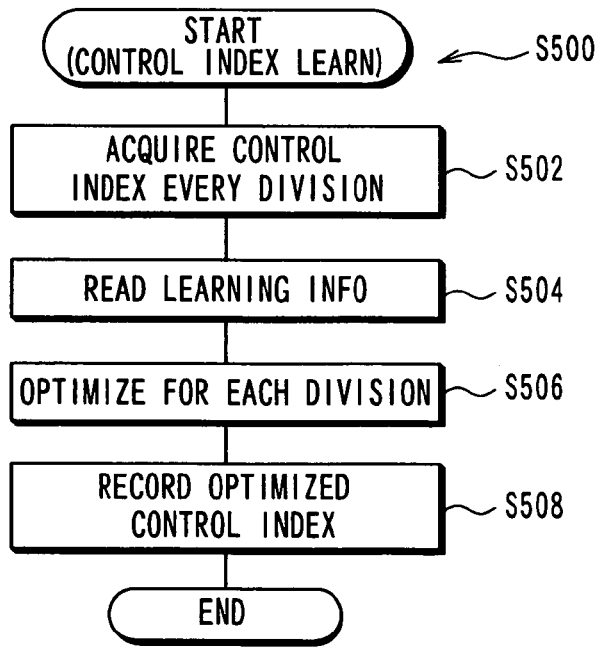
FIG. 18 is a flowchart illustrating a control index value learning process.

After the charge schedule preparation process, as illustrated in FIG. 3, a control index value learning process S500 is executed which learns a control index value and stores the learned one in the durable storage medium 23. The flowchart of the control index learning process is illustrated in FIG. 18.

In the control index value learning process, a control index value is first acquired for every road range (S502). In detail, each control index value (generator electricity consumption threshold value, assist electricity consumption threshold value) which are specified in association with road identifiers in an SOC administrative plan in the durable storage medium 23.

Next, information on control index value learning is read for every, road range (S504). That is, when a control index value in an identical planned road range is already stored in the durable storage medium 23, such a control index value in the identical planned road range is read from the durable storage medium 23. In contrast, when any control index value in the identical planned road range is not stored in the durable storage medium 23, the processing proceeds to the subsequent S506, without reading the control index value.

At S506, the control index value is optimized for every road range. When the control index value in the identical planned road range is already stored in the durable storage medium 23, an average of (i) the control index value in the same planned road range stored in the durable storage medium 23 and (ii) the control index value acquired at S502 is designated as a new control index value. When the control index value in the identical planned road range is not stored in the durable storage medium 23, the control index value acquired at S502 is designated as a new control index value.

Next, this optimized control index value is stored in the durable storage medium 23 (S508). In detail, each control index value (generator electricity consumption threshold value, assist electricity consumption threshold value) which are specified in association with road identifiers is stored along with a start point and a destination in the durable storage medium 23.

Figure 19:
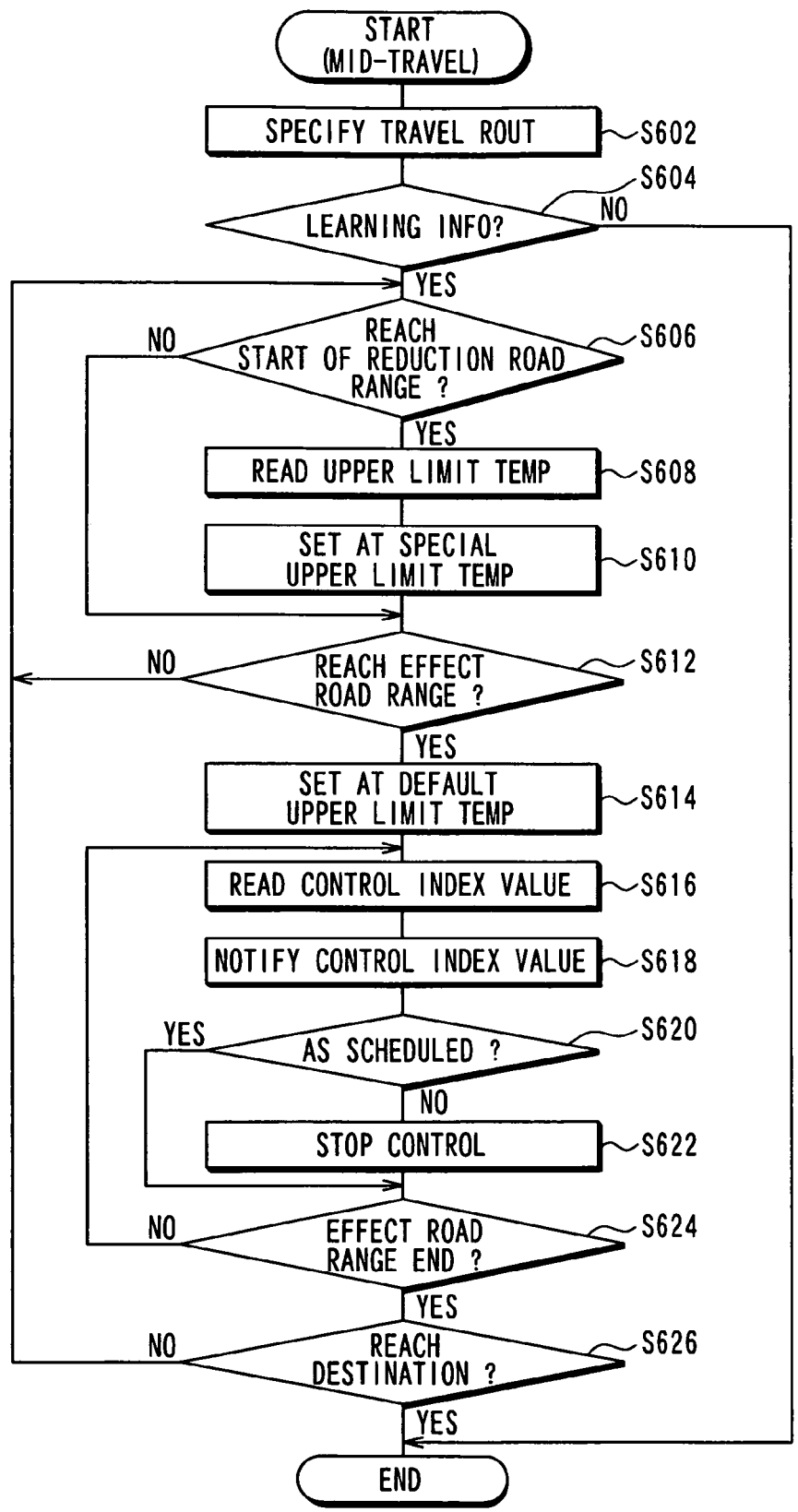
FIG. 19 is a flowchart illustrating a mid-travel process.

Next, a mid-travel process is explained. FIG. 19 shows a flowchart of the mid-travel process. When the occupant executes a predetermined manipulation at the time of starting a vehicle travel of the vehicle, etc., the control circuit 24 starts this mid-travel process.

First, a travel route is specified (S602). In detail, when the destination is specified according to the occupant's manipulation, a route from the present position of the vehicle to the destination is specified.

Next, at S604, it is determined whether the learning information is existing (S604). In detail, this is determined based on whether the travel history with respect to the identical route from the present start point to the present destination is recorded in the durable storage medium 23 while any SOC administrative plan of the schedule effect road range in the route is stored in the durable storage medium 23.

Here, in detail, when it is the case that the travel history with respect to the identical route from the present start point to the present destination is recorded in the durable storage medium 23 while any SOC administrative plan of the schedule effect road range in the route is stored in the durable storage medium 23, the determination at S604 is affirmed, and S606 is executed. When it is not the case, the determination at S604 is negated as NO and the mid-travel process is ended.

At S606, it is determined whether it is the time point at which the subject vehicle reaches the start point of the battery upper limit temperature reduction road range. When it is determined that it is the time point at which the subject vehicle reaches, the subsequently S608 is executed. When it is determined that it is not the time point at which the subject vehicle reaches, S612 is executed. At S612, it is determined-whether the schedule effect road range is reached. When it is determined that the vehicle reaches, S614 is executed. When it is determined that the vehicle does not reach, S606 is executed again.

Thus, when the battery upper limit temperature reduction road range is designated or provided in the road range just prior to the schedule effect road range, the determination at S606 is affirmed as YES and the battery upper limit temperature reduction process at S608 and S610 is executed. When the vehicle completes travel of the battery upper limit temperature reduction road range and enters the schedule effect road range, the determination at S612 is affirmed as YES, S614 and subsequent are executed.

In contrast, when the battery upper limit temperature reduction road range is not designated or provided in the road range just prior to the schedule effect road range, the determination at S612 is never affirmed as YES. Then, when the vehicle enters the schedule effect road range, the determination at S612 is affirmed as YES, and S614 and subsequent are executed.

At S608 immediately after reaching the start point of the battery upper limit temperature reduction road range, the special battery upper limit temperature of the battery upper limit temperature reduction road range entered by the subject vehicle is read from the durable storage medium 23. Then, at S610, the special battery upper limit temperature is outputted to the HV control circuit 10. The battery upper limit temperature of the HV control circuit 10 is changed from the default battery upper limit temperature into the special battery upper limit temperature.

At S614 immediately after entering the schedule effect road range, the default battery upper limit temperature is outputted to the HV control circuit 10. Thereby, the battery upper limit temperature of the HV control circuit 10 is set to the default battery upper limit temperature. Therefore, when the vehicle was in the battery upper limit temperature reduction road range just before entering the schedule effect road range, the battery upper limit temperature of the HV control circuit 10 is changed to the default battery upper limit temperature from the special battery upper limit temperature. In contrast, when the vehicle was not in the battery upper limit temperature reduction road range just before entering the schedule effect road range, the battery upper limit temperature of the HV control circuit 10 is maintained at the default battery upper limit temperature.

Thus, in the HV control circuit 10, the battery upper limit temperature in the battery upper limit temperature reduction road range is set at the special battery upper limit temperature; thereby, the cooling control is executed when the battery temperature is increased to equal to or greater than the special battery upper limit temperature. Therefore, in the battery upper limit temperature reduction road range, the control is made such that the temperature of the battery 9 is less than the special battery upper limit temperature, which is lower than the default battery upper limit temperature.

Then, when the vehicle completes travel of the battery upper limit temperature reduction road range and enters the schedule effect road range, the battery upper limit temperature is returned to the default battery upper limit temperature higher than the special battery upper limit temperature. At the start point of the schedule effect road range (i.e., the end point of the battery upper limit temperature reduction road range), the temperature of the battery 9 is controlled to be less than the special battery upper limit temperature. After entering the schedule effect road range, the temperature of the battery 9 does not reach the default battery upper limit temperature even if the temperature of the battery 9 rises by the estimated elevation-temperature or temperature increase. Thus, the cooling control is not executed. Therefore, the battery restriction strengthening control is not executed, either. The battery 9 can thus accumulate energy efficiently, without input electric power to the battery 9 restricted. This increases a possibility to realize the charge and discharge of the battery 9 as an intended charge plan.

Then, at S616, the control index value is read out. In detail, the control index value of each road division specified in the SOC administrative plan of the schedule effect road range is read from the durable storage medium 23.

Next, the control index value in the present position of the vehicle is notified to the HV control circuit (S618). When the vehicle is located in the schedule effect road range, the control index value in the present position of the vehicle is notified to the HV control circuit. When the vehicle is not located in the schedule effect road range, a notification of the control index value is interrupted. When interrupted, the HV control circuit 10 executes a control of the electric generator 2 and the motor 3 such that the charge amount of the battery 9 approaches the reference SOC.

At S620, it is determined whether the charge amount of the battery 9 takes place as scheduled or planned based on whether the present SOC takes place according to the request transfer electric power amount BPwref.

When the present SOC takes place according to the request transfer electric power amount BPwref, the determination at S620 is affirmed as YES. Next, it is determined whether the vehicle arrives at the end point of the schedule effect road range (S624). When the vehicle does not arrive at the end point of the schedule effect road range, the determination at S624 is negated as NO, returning the processing to S616.

In addition, when the present SOC does not take place according to the request transfer electric power amount BPwref, the determination at S620 is negated as NO, and the drive control is stopped even before the vehicle reaches a point within a predetermined distance range based on the destination (S622). In detail, the notification of the control index value is stopped. In such a case, the HV control circuit 10 executes the drive control such that the charge amount of the battery 9 may approach the reference SOC.

When the vehicle then arrives at the end point of the schedule effect road range, S626 is executed. It is determined whether the vehicle arrived at the destination based on whether the vehicle reaches a point within a predetermined distance range based on the destination. When not arriving, the processing returns to S606. The processing waits for the arrival to the start point of a next battery upper limit temperature reduction road range, or the arrival to the start point of a next schedule effect road range. When the vehicle arrives at the destination, the mid-travel process is ended.

According to the above-mentioned configuration of the present embodiment, the drive control of the engine and motor is executed by specifying the schedule of the control index value based on the first information for specifying the control index value; the second information for extracting the road range, in which acquisition of a predetermined fuel mileage enhancement effect is estimated, is collected with fixed cycles or predetermined intervals; a schedule of the control index value is specified with respect to the road range from the starting point to the destination based on the second information; the road range, in which acquisition of a predetermined fuel mileage enhancement effect is estimated, is extracted; a schedule of the control index value is specified with respect to each of predetermined unit road divisions of each road range extracted based on the first information so as to decrease a fuel consumption of the engine; and the drive control is executed according to the thus-specified schedule of the control index value. That is, with respect to a road range in which acquisition of a predetermined fuel mileage enhancement is estimated by specifying a schedule of a control index value, the schedule of the control index value is specified so as to decrease an engine fuel consumption and the drive control is executed according to the schedule of the control index value. In contrast, with respect to a road range in which acquisition of a predetermined fuel mileage enhancement is not estimated by specifying a schedule of a control index value, any schedule of the control index value is not specified. It is possible for a driver to execute a low fuel consumption travel to match a travel of peripheral vehicles; thus, the enhancement in the fuel mileage in the hybrid vehicle can be achieved. It is noted that the first information includes a road gradient (grade), a vehicle velocity, and a driving power; the second information includes a road length of a road range, a road gradient (grade), a travel time within a road range, a stop ratio within a road range, an electric load to drive the motor 3, and a vehicle velocity.

Further, the road range in which acquisition of a predetermined fuel mileage enhancement is estimated by specifying a schedule of a control index value may be as follows: (1) a road range has a length equal to or greater than a predetermined threshold value with a downward inclination of an average gradient equal to or less than a threshold value; (2) a road range has a travel time equal to or greater than a predetermined threshold value with a stop ratio equal to or greater than a predetermined threshold value and an electric load to drive the motor equal to or greater than a Predetermined threshold value; or (3) a road range has a travel time equal to or greater than a predetermined threshold value with an average vehicle velocity equal to or less than a threshold value.

Further, as explained above, the second information is used to extract the road range in which acquisition of a predetermined fuel mileage enhancement is estimated by specifying a schedule of a control index value; the standard deviation or degree of the deviation of the second information is determined. When it is determined that the degree of the deviation is less than a predetermined threshold value, the road range in which acquisition of a predetermined fuel mileage enhancement is estimated by specifying a schedule of a control index value is extracted from a route from a starting point to a destination based on the second information. The road range can be thus extracted with a sufficient accuracy.

It is noted that in the above embodiment, the HV control circuit 10 functions as a charge and discharge control means or section by executing the charge and discharge control 10a, and functions as a battery temperature control means or section by executing the battery temperature control 10b.

In addition, the control circuit 24 of the navigation ECU 20 functions as an example of an estimate means or section by executing S715; a temperature designation means or section by executing S720; a road range designation means or section by executing S725; a change means or section by executing S606 to S614; a schedule preparation means or section by executing S400; a determination means or section by executing S750; or a prohibition means or section or cancellation means or section by executing S760.

Other Embodiments

While there have been described specific preferred embodiments of the present invention, it is to be distinctly understood that the present invention is not limited thereto and includes various modes capable of embodying functions of specifics of the present invention.

For example, when the determination at S750 in FIG. 12 is negated as NO, the schedule effect road range itself is canceled. However, it may be unnecessary to be always the same. For instance, in the case that a schedule effective road range which is a target of the battery temperature designation process is a schedule effective road range extracted at S306 in FIG. 9 (i.e., a road range of low-speed traffic congestion), the schedule effective road range may be maintained not-canceled while any battery upper limit temperature reduction road range is not provided when the determination at S750 is negated as NO.

In addition, the determination process at S750 in FIG. 12 is unnecessary to be always executed. For example, immediately after S745, S755 may be directly executed.

In addition, the temperature increase in the planned road range estimated at S715 in FIG. 12 may be, for example, obtained as follows. Based on the change in the road gradient of the schedule effective road range recorded on the map data, a potential energy acquirable in the schedule effective road range is calculated; thereby, the temperature increase may be obtained by multiplying the potential energy by a temperature rise rate per unit acquisition energy [° C./(Wh)].

Such a case can eliminate the necessity of using the travel history for estimating the temperature increase.

The potential energy in the above is an example of an estimate value of an energy acquirable by regeneration in the schedule effect road range. Thus, as long as the temperature increase is to be calculated based on an estimate of energy acquirable by regeneration in the planned road range, it may be obtained using any method other than that in the above embodiment.

In addition, the in-vehicle charge and discharge control apparatus of the present embodiment may be mounted in a plug-in hybrid vehicle a battery of which can be charged by connecting with an external electric power source, or mounted in an electric vehicle which runs only by the motor 3 as a driving power. In addition, it may be mounted in a vehicle which runs only by a driving power of an internal combustion while having a battery to supply the electric power only to an auxiliary apparatus in the vehicle. That is, the battery can be just a rechargeable battery which supplies electric power to any of electronic apparatuses in the vehicle.

In addition, what is necessary is just the estimated road range expected that, as for the schedule effective road range of the above embodiment, the vehicle runs. It is good not to be necessarily the schedule effective road range. As an estimated road range expected that the vehicle runs, you may be some road ranges of the route from the departure point calculated by navigation ECU 20 to the destination like the above embodiment, as long as it runs along the road with the actual condition, you may be the road range it will run.

In addition, the control index may include not only the generator electricity consumption threshold value and assist electricity consumption threshold value, but also a target SOC, or an output ratio of the motor 3 and engine 1. That is, as long as the control index is an amount which is used together with a present request driving power of the vehicle to thereby enable the determination of a request electric power transfer amount of the battery 9, it may be any amount.

In addition, in the above embodiment, although the nickel hydoride battery is used as the battery 9, any other rechargeable battery can be used. When using a rechargeable battery other than the nickel hydoride battery, a default value, which is different from 40° C., of the battery upper limit temperature may be designated according to the characteristic of the used rechargeable battery.

In addition, in the above embodiment, as the information on the first for specifying the control index value with the travel of the vehicle, a schedule of the control index value is specified with respect to each of road divisions of the extracted schedule effect road range so as to decrease a fuel consumption of the engine and a schedule of the control index value is specified with respect to each of road divisions of the extracted schedule effect road range so as to decrease a fuel consumption of the engine and In addition, the second information is used for extracting a road range in which acquisition of a predetermined fuel mileage enhancement effect is estimated by specifying a schedule of the control index value to execute a drive control of the engine and the motor; the second information includes a road length of a road range, a road gradient (grade), a travel time within a road range, a stop ratio within a road range, an electric load to drive the motor 3, and a vehicle velocity. Alternatively, a schedule effect road range may be extracted based on information other than the above second information.

Further, in the above embodiment, at the time of ending a travel of the vehicle, a schedule of a control index value about a schedule effective road range is specified based on the first and second information collected in conjunction with the travel of the vehicle and collected information is stored in the durable storage medium 23; at the next travel of the vehicle, a drive control is executed according to the schedule of the control index value about the schedule effective road range stored in the durable storage medium 23. Without need to be limited thereto, for example, the first and second information collected in conjunction with the travel of the vehicle may be learned for every predetermined cycle; a schedule effective road range may be extracted from a road range from a start point up to a target point based on the learned second information, and a schedule of a control index value may be specified by using the learned first information so as to decrease an engine fuel consumption in the schedule effective road range.

Further, the above embodiment illustrates the example in which the travel information for specifying the control index value is collected for every fixed cycle, and stored in the durable storage medium 23. For example, the travel information for specifying the control index value may be collected for every predetermined time, and the collected information may be stored in the durable storage medium 23.

In addition, the above embodiment illustrates the example in which a control index value (target SOC) of the charge amount of the battery to supply the motor with the electric power is used as a control index value of which the schedule is specified. Data other than the target SOC of the charge amount of the battery may be used as a control index value of which the schedule is specified. That is, in the case that the SOC when entering a certain road division or range is "B" while the SOC when leaving is "C", any data other than the charge amount of the battery can be used as long as such data enables the transfer from "B" to "C" by the control within the certain road division or range.

In addition, in the above embodiment, as illustrated in FIG. 14, road ranges 1, 2, and 3, which are located serially, are extracted from a route from a starting point to a destination. For example, road ranges 1 and 3, which are not located serially, may be extracted from the route from the starting point to the destination.

According to the embodiment, the HV control circuit 10 and the control circuit 24 perform the programs to implement the functions. The functions may be replaced by a hardware device having the equivalent functions. Such hardware device may include an FPGA capable of programming the circuit construction.

Aspects of the disclosure described herein are set out in the following clauses.

As an aspect of the disclosure, an in-vehicle charge and discharge control apparatus in a vehicle having a battery to supply an electric power to an electronic apparatus is provided as follows. The battery accumulates an electric power which a motor in the vehicle generates by regeneration during deceleration of the vehicle. The in-vehicle charge and discharge control apparatus comprises a battery temperature control section, an estimate section, a temperature designation section, a temperature designation section, a temperature designation section, a road range designation section, and a change section. Here, the battery temperature control section is configured to execute a cooling control when a battery temperature is equal to or greater than a battery upper limit temperature, the cooling control executing a battery restriction strengthening control which reduces in the battery a maximum of an input and output power to the electronic apparatus. The estimate section is configured to estimate a temperature increase of the battery in an estimate road range, which the vehicle is estimated to travel, based on an estimate of energy acquirable by regeneration in the estimate road range. The temperature designation section is configured to designate as a special value of the battery upper limit temperature a temperature obtained by subtracting the temperature increase from a default value of the battery upper limit temperature. The road range designation section is configured to designate a road range just prior to the estimate road range as a battery upper limit temperature reduction road range. The change section is configured to cause the battery temperature control section to execute a battery upper limit temperature changeover control. The battery upper limit temperature changeover control changes a value of the battery upper limit temperature from the default value to the special value in cases that the vehicle is running the battery upper limit temperature reduction road range, and returns the value of the battery upper limit temperature from the special value to the default value in cases that the vehicle completes traveling of the battery upper limit temperature reduction road range and enters the estimate road range.

As an optional aspect, the in-vehicle charge and discharge control apparatus may further comprise a schedule preparation section and a charge and discharge control section. The schedule preparation section may be configured to previously designate a control index value about a charge and discharge of the battery with respect to each of a plurality of index designation road divisions, which the estimate road range is divided into, under a premise that the cooling control is not executed in the estimate road range The charge and discharge control section may be configured to (i) determine a delivery and reception amount of a requested electric power based on a present requested driving power of the vehicle and a control index value corresponding to a present position of the vehicle out of control index values designated by the schedule preparation section in cases that the vehicle is running the estimate road range, and (ii) control the motor as the electronic apparatus so as to satisfy the determined delivery and reception amount of the requested electric power.

Thus, designation of the battery upper limit temperature reduction road range results in the increase of the possibility to achieve the charge and discharge of the battery as previously scheduled relative to the estimate road range.

As an optional aspect, the in-vehicle charge and discharge control apparatus may further comprise a determination section configured to make a determination as to whether a first case enables the battery to accumulate more energy than a second case. Here, the first case is a case where during running of the battery upper limit temperature reduction road range, the battery upper limit temperature is set at the special value by being changed from the default value. The second case is a case where during running of the battery upper limit temperature reduction road range, the battery upper limit temperature reduction is set to the default value by not being changed to the special value. The change section may be further configured to cause the battery temperature control section to execute the battery upper limit temperature changeover control based on an affirmative result of the determination made by the determination section.

Such a configuration may choose the case where more energy can be accumulated in the battery to control such that the battery upper limit temperature is temporarily reduced in the battery upper limit temperature reduction road range. The battery is thus enabled to accumulate energy more efficiently.

As an optional aspect, the in-vehicle charge and discharge control apparatus including above-mentioned the schedule preparation section and the charge and discharge control section may further comprise: a determination section and a prohibition section. The determination section may be configured to make a determination as to whether a first case enables the battery to accumulate more energy than a second case. The first case is a case where during running of the battery upper limit temperature reduction road range, the battery upper limit temperature is set at the special value by being changed from the default value. The second case is a case where during running of the battery upper limit temperature reduction road range, the battery upper limit temperature reduction is set to the default value by not being changed to the special value. The prohibition section may be configured to prohibit the schedule preparation section from designating the control index values in the estimate road range based on a negative result of the determination made by the determination section.

Thus, in the case that more energy cannot be accumulated in the battery, any battery upper limit temperature reduction road range is not designated; further, the schedule itself of the control index in the estimate road range is canceled. The reason for providing such a configuration is as follows. That is, even if a battery upper limit temperature reduction road range is designated, the battery cannot thereby obtain a merit in respect of the energy. Further, if any battery upper limit temperature reduction road range is not provided, the charge and discharge cannot be eventually executed as planned in the estimate road range. The meaning of making a charge plan in the estimate road range itself fades away.

As an optional aspect of the in-vehicle charge and discharge control apparatus, the change section may cause the battery temperature control section to execute the battery upper limit temperature changeover control in cases that the battery temperature in a travel history of the estimate road range is equal to or greater than the default value of the battery upper limit temperature.

Such a configuration may choose the case that the battery temperature in a travel history of the estimate road range is equal to or greater than the default value of the battery upper limit temperature to thereby control such that the battery upper limit temperature is temporarily reduced in the battery upper limit temperature reduction road range. The battery is thus enabled to accumulate energy more efficiently.

It will be obvious to those skilled in the art that various changes may be made in the above-described embodiments of the present invention. However, the scope of the present invention should be determined by the following claims.

What is claimed:

1. An in-vehicle charge and discharge control apparatus in a vehicle having a battery to supply an electric power to an electronic apparatus in the vehicle, the battery accumulating an electric power which a motor in the vehicle generates by regeneration during deceleration of the vehicle,
the in-vehicle charge and discharge control apparatus comprising:
a battery temperature control device to execute a cooling control when a battery temperature is equal to or greater than a battery upper limit temperature,
the cooling control executing a battery restriction strengthening control which reduces in the battery a maximum of an input and output power to the electronic apparatus;
an estimate device to estimate a temperature increase of the battery in an estimate road range, which the vehicle is estimated to travel, based on an estimate of energy acquirable by regeneration in the estimate road range;
a temperature designation device to designate as a special value of the battery upper limit temperature a temperature obtained by subtracting the temperature increase from a default value of the battery upper limit temperature;
a road range designation device to designate a road range just prior to the estimate road range as a battery upper limit temperature reduction road range; and
a change device to cause the battery temperature control device to execute a battery upper limit temperature changeover control that
changes a value of the battery upper limit temperature from the default value to the special value in cases that the vehicle is running the battery upper limit temperature reduction road range, and
returns the value of the battery upper limit temperature from the special value to the default value in cases that the vehicle completes traveling of the battery upper limit temperature reduction road range and enters the estimate road range.

2. The in-vehicle charge and discharge control apparatus according to claim 1, further comprising:
a schedule preparation device to previously designate a control index value about a charge and discharge of the battery with respect to each of a plurality of index designation road divisions, which the estimate road range is divided into, under a premise that the cooling control is not executed in the estimate road range; and
a charge and discharge control to device to
determine a delivery and reception amount of a requested electric power based on (i) a present requested driving power of the vehicle and (ii) a control index value corresponding to a present position of the vehicle out of control index values designated by the schedule preparation device in cases that the vehicle is running the estimate road range, and
control the motor as the electronic apparatus so as to satisfy the determined delivery and reception amount of the requested electric power.

3. The in-vehicle charge and discharge control apparatus according to claim 1, further comprising:
a determination device to make a determination as to whether a first case enables the battery to accumulate more energy than a second case,
the first case where during running of the battery upper limit temperature reduction road range, the battery upper limit temperature is set at the special value by being changed from the default value,
the second case where during running of the battery upper limit temperature reduction road range, the battery upper limit temperature reduction is set to the default value by not being changed to the special value,
the change device being further configured to cause the battery temperature control to execute the battery upper limit temperature changeover control based on an affirmative result of the determination made by the determination device.

4. The in-vehicle charge and discharge control apparatus according to claim 2, further comprising:
a determination device to make a determination as to whether a first case enables the battery to accumulate more energy than a second case,
the first case where during running of the battery upper limit temperature reduction road range, the battery upper limit temperature is set at the special value by being changed from the default value,
the second case where during running of the battery upper limit temperature reduction road range, the battery upper limit temperature reduction is set to the default value by not being changed to the special value; and
a prohibition device to prohibit the schedule preparation device from designating the control index values in the estimate road range based on a negative result of the determination made by the determination device.

5. The in-vehicle charge and discharge control apparatus according to claim 1, wherein
the change device causes the battery temperature control device to execute the battery upper limit temperature changeover control in cases that the battery temperature in a travel history of the estimate road range is equal to or greater than the default value of the battery upper limit temperature.

6. The in-vehicle charge and discharge control apparatus according to claim 2, further comprising:
a determination device to make a determination as to whether a first case enables the battery to accumulate more energy than a second case,
the first case where during running of the battery upper limit temperature reduction road range, the battery upper limit temperature is set at the special value by being changed from the default value,
the second case where during running of the battery upper limit temperature reduction road range, the battery upper limit temperature reduction is set to the default value by not being changed to the special value,
the change device being further configured to cause the battery temperature control device to execute the battery upper limit temperature changeover control based on an affirmative result of the determination made by the determination device.

7. The in-vehicle charge and discharge control apparatus according to claim 2, wherein
the change device causes the battery temperature control device to execute the battery upper limit temperature changeover control in cases that the battery temperature in a travel history of the estimate road range is equal to or greater than the default value of the battery upper limit temperature.

8. The in-vehicle charge and discharge control apparatus according to claim 3, wherein
the change device causes the battery temperature control device to execute the battery upper limit temperature changeover control in cases that the battery temperature in a travel history of the estimate road range is equal to or greater than the default value of the battery upper limit temperature.

9. The in-vehicle charge and discharge control apparatus according to claim 4, wherein
the change device causes the battery temperature control device to execute the battery upper limit temperature changeover control in cases that the battery temperature in a travel history of the estimate road range is equal to or greater than the default value of the battery upper limit temperature.

10. A partial control apparatus included in an in-vehicle charge and discharge control apparatus in a vehicle having a battery to supply an electric power to an electronic apparatus in the vehicle, the battery accumulating an electric power which a motor in the vehicle generates by regeneration during deceleration of the vehicle,
the partial control apparatus comprising:
an estimate device to estimate a temperature increase of the battery in an estimate road range, which the vehicle is estimated to travel, based on an estimate of energy acquirable by regeneration in the estimate road range;
a temperature designation device to designate as a special value of a battery upper limit temperature a temperature obtained by subtracting the temperature increase from a default value of the battery upper limit temperature;
a road range designation device to designate a road range just prior to the estimate road range as a battery upper limit temperature reduction road range; and
a change device to execute a battery upper limit temperature changeover control that
changes a value of the battery upper limit temperature from the default value to the special value in cases that the vehicle is running the battery upper limit temperature reduction road range, and
returns the value of the battery upper limit temperature from the special value to the default in cases that the vehicle completes traveling of the battery upper limit temperature reduction road range and enters the estimate road range.

* * * * *